United States Patent [19]

Bloodworth

[11] 4,455,646

[45] Jun. 19, 1984

[54] PULSE CODE MODULATED DIGITAL AUTOMATIC EXCHANGE

[75] Inventor: William T. Bloodworth, Naperville, Ill.

[73] Assignee: Richard L. Scully, Barrington Hills, Ill. ; a part interest

[21] Appl. No.: 412,013

[22] Filed: Aug. 26, 1982

[51] Int. Cl.³ .................... H04J 3/02; H03K 17/00
[52] U.S. Cl. ...................................... 370/66; 370/67; 370/68
[58] Field of Search ..................... 370/58, 66, 67, 68

[56] References Cited

U.S. PATENT DOCUMENTS

| | | | |
|---|---|---|---|
| 4,020,290 | 4/1977 | Perna et al. | 370/58 |
| 4,071,701 | 1/1978 | Leisonhufvud et al. | 370/66 |
| 4,131,763 | 12/1978 | Herschtal | 370/66 |
| 4,168,401 | 9/1979 | Molleron et al. | 370/66 |
| 4,322,843 | 3/1982 | Beuscher et al. | 370/58 |

*Primary Examiner*—Douglas W. Olms
*Assistant Examiner*—Frank M. Scutch, III
*Attorney, Agent, or Firm*—Kinzer, Plyer, Dorn & McEachran

[57] ABSTRACT

A pulse code modulated digital automatic exchange for a telephone network or other communication network has a multiplicity of N input/output ports connected to an input/output system comprising a plurality of multiplexers that each scan a small group of ports in a predetermined cycle; output signals from the multiplexers are converted into M-bit parallel digital data signals and recorded in an input data store at a location identified with the port of origin. The input data store is scanned, by a fully bused synchronous transfer system, in accordance with a predetermined transfer time cycle having at least N fixed transfer time slots, one for each communication port; during the transfer time slot for any port, data recorded in the input store from that port is transferred, via an M-digit parallel data bus, to a location in an output data store associated with another port for which that data is destined. From the output store the data signals are supplied to a reverse converter and then to de-multiplexers, all part of the input/output system, connected back to the input/output ports. Sequence control circuits control the timing of operations within the transfer system to correlate the transfer of data, during a call between any two ports, so that the transfer time slot for each port in a given call becomes the input time slot for that port and the output time slot for the other port. Hook switch information, tone data, port identification data, and all other control information is bused throughout the transfer system of the exchange. For networks in which data is already in digital form, the conversion stages may be required to translate from serial to parallel form or from one digital format to another, as contrasted with the analog-to-digital conversion required for audio circuits. The input and output stores may be combined in a unified input/output store.

40 Claims, 14 Drawing Figures

DATA CONVERSION UNIT 46

PART OF PATH CONTROL 76

MASTER CLOCK 93 AND PART OF SEQUENCE CONTROL 95

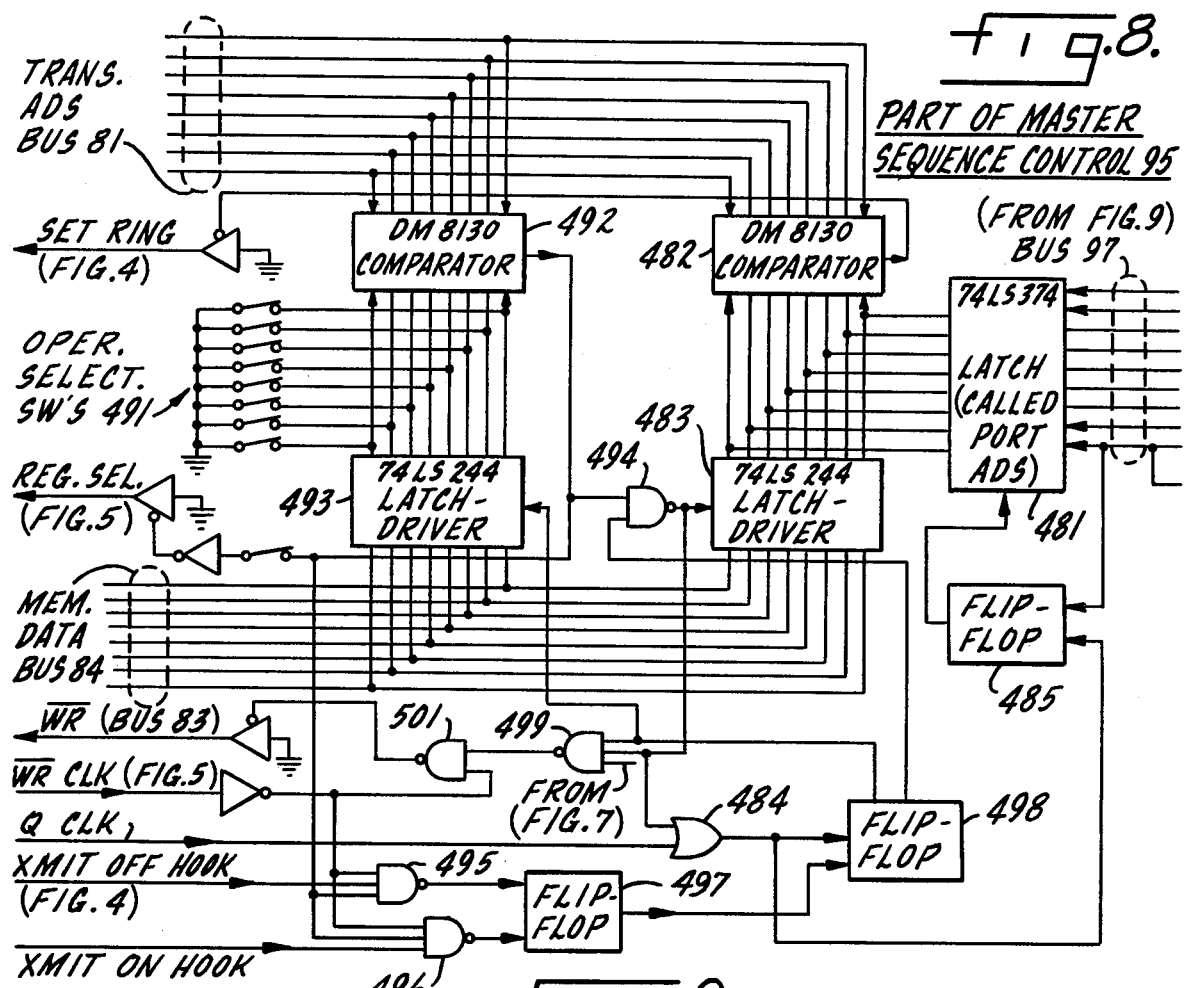

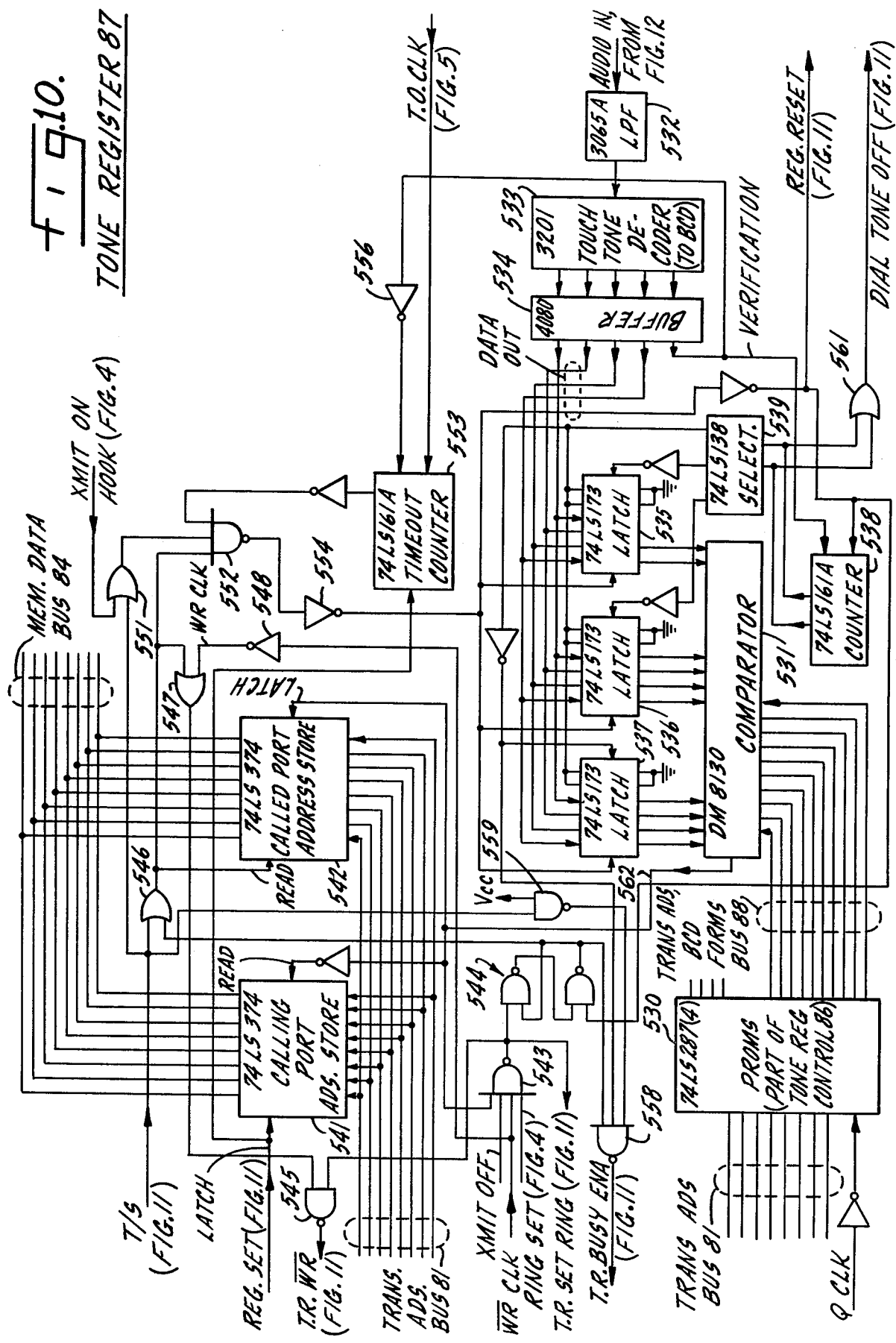

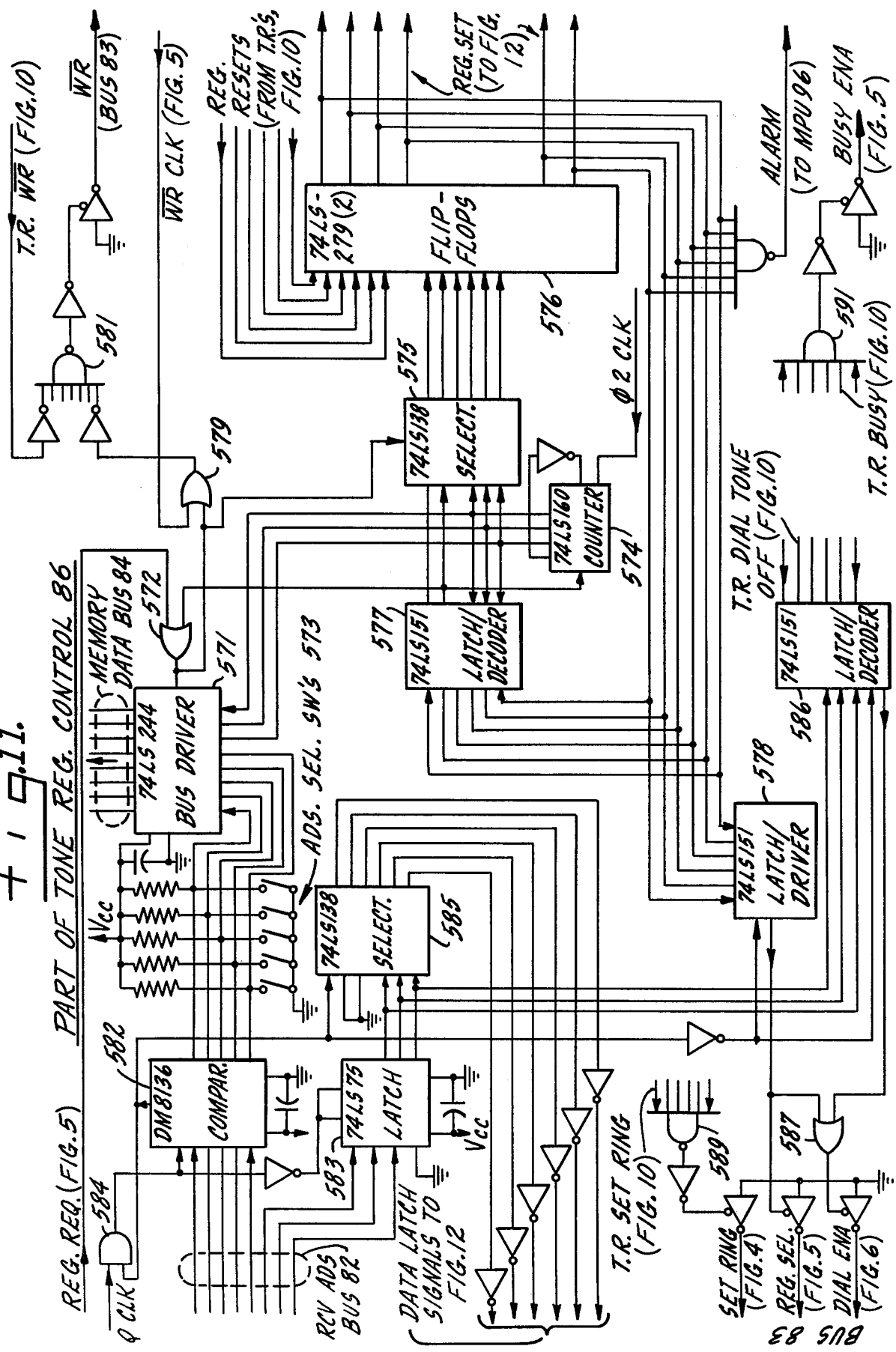

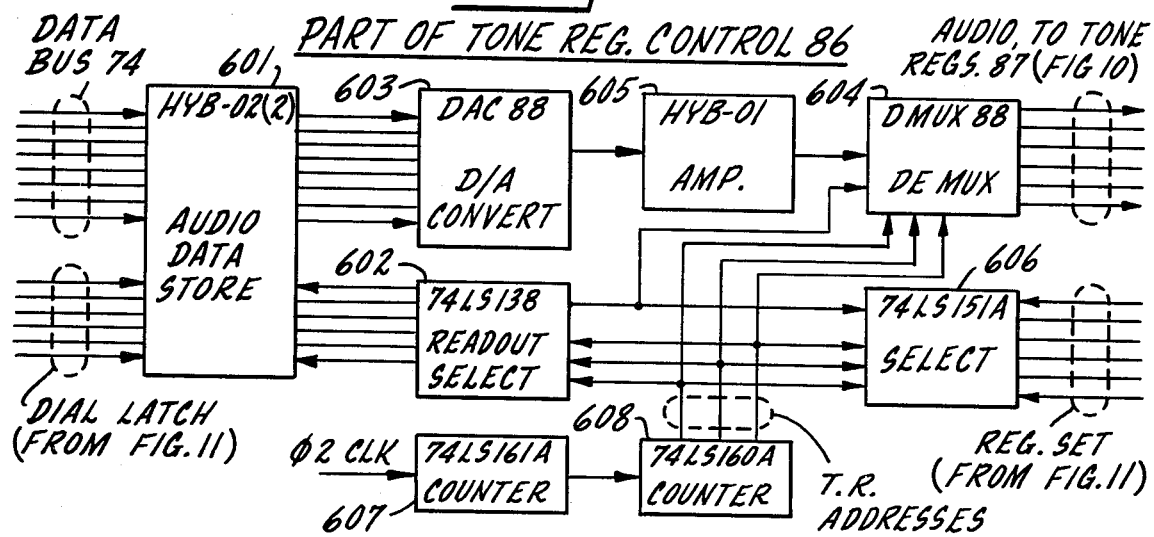
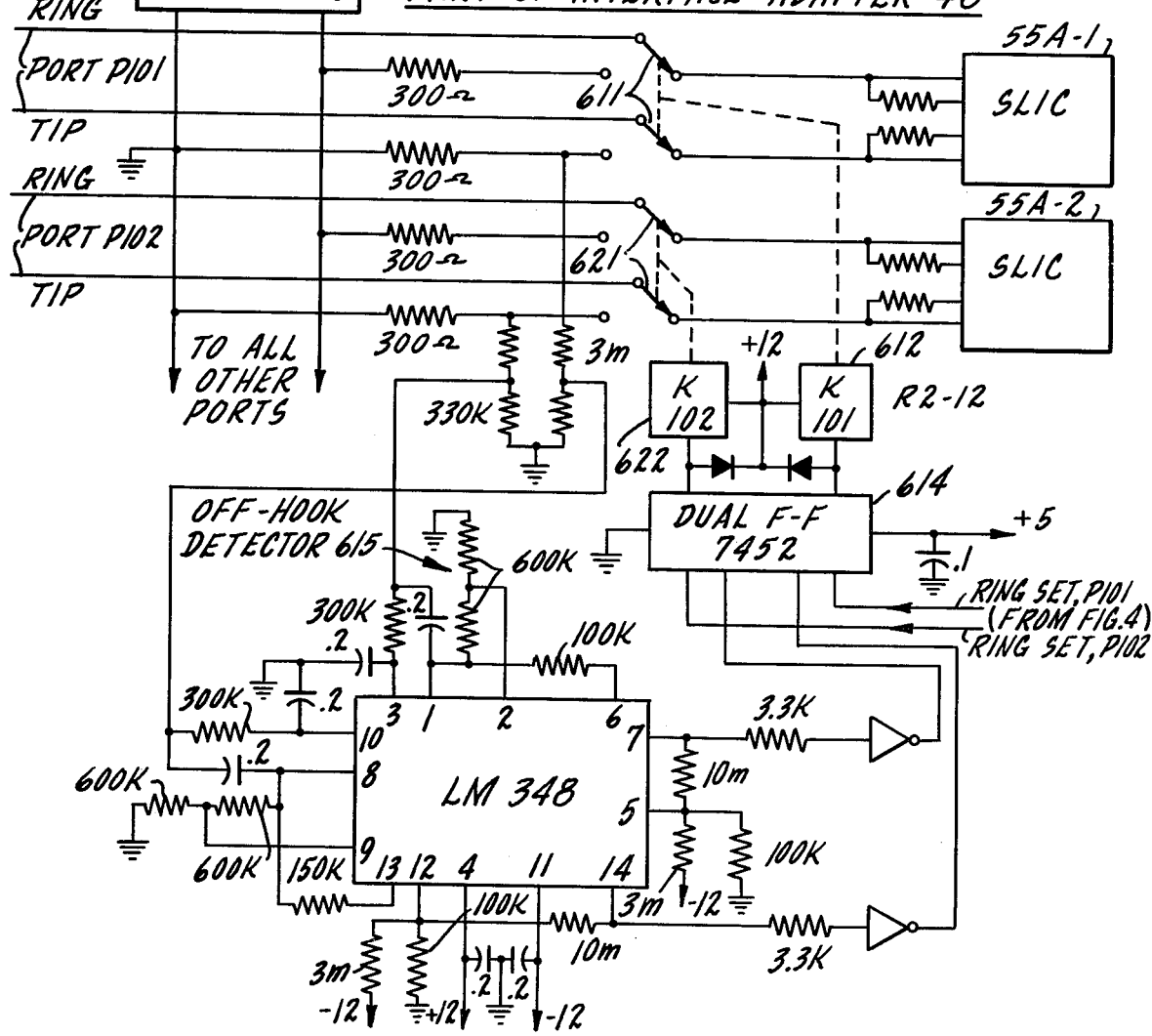

PULSE CODE MODULATED DIGITAL AUTOMATIC EXCHANGE

BACKGROUND OF THE INVENTION

For purposes of speed and econony of construction, private automatic branch exchanges for telephone networks have been constructed in which the audio data from each port is first converted to digital form for transmission through the exchange, then re-converted to analog form as supplied to another port. The digitized audio data is customarily transmitted through the exchange in serial form, with control of the data transmission through the exchange controlled by one or more microprocessors.

A digitized exchange of this kind has a number of substantial limitations and problems. Internal timing presents substantial difficulties and the serialized data transfer arrangement entails cumbersome software that is quite difficult to compose. The microprocessors impose a substantial limitation on the speed at which the transfer of data between ports can be accomplished if the exchange serves a considerble number of ports (e.g., two hundred or more). A large number of conductors are required for transmission of data between ports, in any exchange of substantial capacity, so that the full economic potential of digital operation is difficult and, in larger exchanges, virtually impossible to realize.

SUMMARY OF THE INVENTION

It is an object of the present invention, therefore, to provide a new and improved digital automatic exchange, for a telephone network or other communication network, that effectively minimizes or eliminates the aforementioned problems and difficulties of previously known digital exchanges.

Another object of the invention is to provide a new and improved pulse code modulated digital automatic exchange in which all data is transferred from one port to another in the form of M-bit parallel digital data words, so that a fully bused high speed data transfer can be realized. This object of the invention is realized, in part, by assigning a specific transfer time slot, in a very high speed transfer cycle, to each port, and by utilizing the assigned transfer time slot for each port both as the transmit time slot for that port and as the receive time slot for another port connected thereto in a call.

A further object of the invention is to provide a new and improved pulse code modulated digital automatic exchange in which all normal data transfer and control functions are performed in a hard-wired fully bused transfer system independent of any microprocessor in order to obtain maximum speed of transfer and thus maximize the permissible capacity of the exchange, while providing for overriding control of special functions through a microprocessor.

Accordingly, the invention relates to a pulse code modulated digital automatic exchange for a telephone network or like communication network, comprising an input/output system including line connection means defining N communication ports, a series of input multiplex conversion means, each connected to a plurality of the communication ports and each generating a multiplexed sequence of M-bit parallel digital data signals, each digital data signal being representative of an input signal received at one communication port, and a corresponding series of output de-multiplex conversion means, each connected to the plurality of communication ports served by one input conversion means, for converting M-bit parallel digital data signals to output signals and selectively applying those output signals to those communication ports. The input/output system further includes conversion control means connected to the input conversion means and the output conversion means, for actuating each input conversion means and its associated output conversion means at a multiplex conversion rate determined by the nature of the input and output signals, in accordance with a multiplex scan cycle of given duration, data storage means connected to the input conversion means and the output conversion means, including at least N M-bit storage locations, at least one storage location associated with each communication port, and path control means connected to the conversion control means and the data storage means, for correlating any and all possible combinations of two communication ports for data transfer calls and actuating the data storage means to effect a first series of transfers of parallel M-bit digital data signals from a storage location for one port in a call to a storage location for the other port in that call and a second series of transfers of parallel digital data signals from a storage location for the called port to a storage location for the one port in that call. The exchange further comprises a data transfer system including an M-bit parallel digital data bus connected to the data storage means, for transferring digital data signals recorded at one location in the data storage means to another location in the data storage means, and sequence control means connected to the path control means, for actuating the path control means in accordance with a transfer cycle of sequential transfer time slots, one time slot assigned to each communication port, with one of the series of data transfers occurring in the time slots assigned to the calling port in a call and the other series of data transfers occurring in the time slots assigned to the called port in that call. The duration of the complete transfer cycle encompassing all N ports is no greater than the duration of the multiplex scan cycle.

BRIEF DESCRIPTION OF THE DRAWINGS

FIGS. 5, 6, 7 and 8 are somewhat simplified circuit diagrams illustrating a preferred construction for a master sequence control and master clock incorporated in the data transfer system that is a part of the exchange shown in Fig. 1;

FIG. 9 is a simplified circuit diagram of a main processor unit utilized to interface an operator's console with the sequence control circuits of the exchange shown in FIG. 1;

FIG. 10 is a circuit diagram for a tone register incorporated in an address decoder module in the data transfer system of the exchange of FIG. 1;

FIGS. 11 and 12 constitute simplified circuit diagrams for a tone register control unit that is a part of the data transfer system in the exchange of FIG. 1;

FIG. 13 is a circuit diagram of a part of a communication interface adapter circuit that is included in the input/output system of the exchange of FIG. 1; and FIG. 14 is a timing diagram for a number of the principal control functions performed in the transfer system of the exchange of FIG. 1.

DESCRIPTION OF THE PREFERRED EMBODIMENTS

Figure 1:
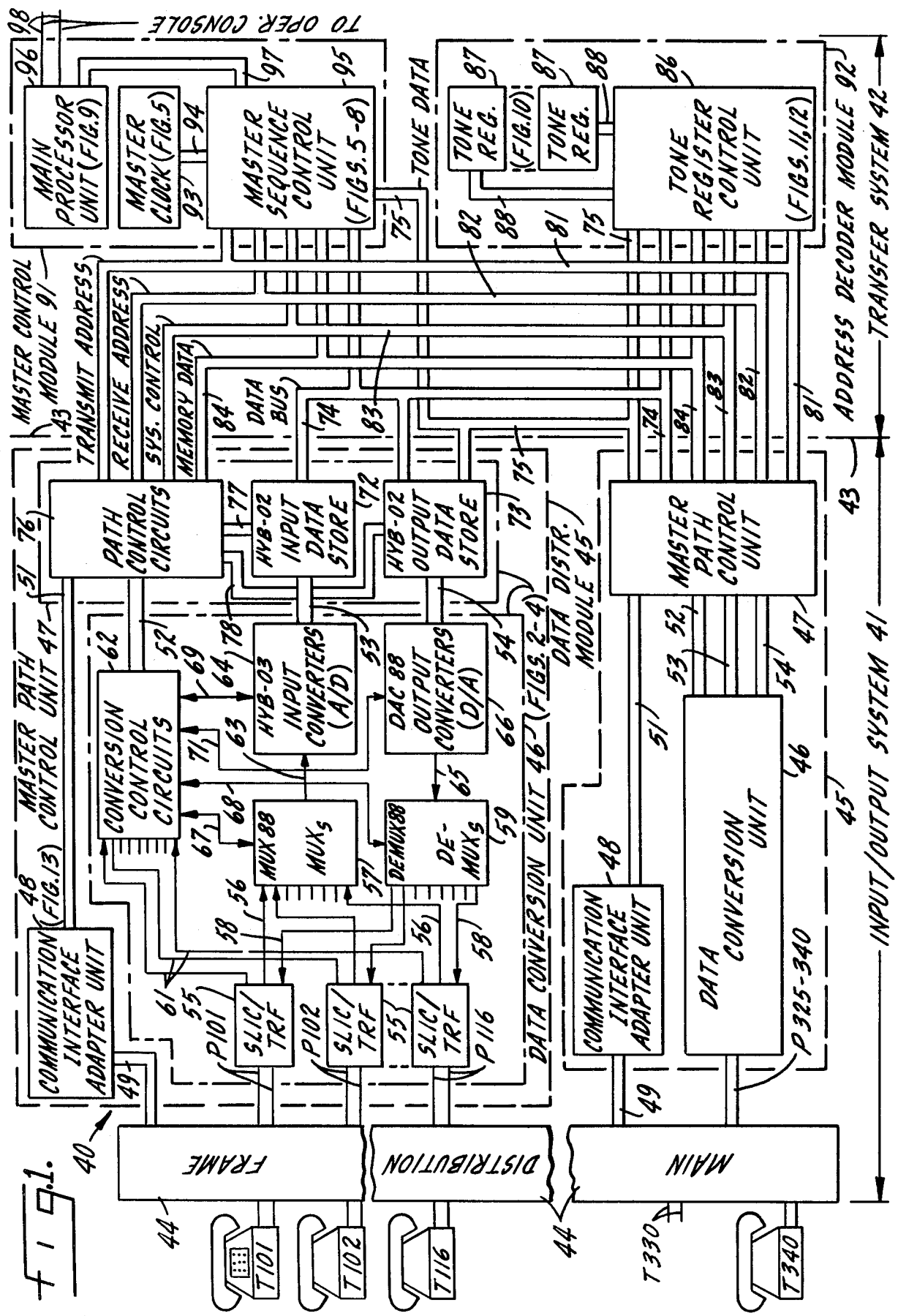
FIG. 1 is a simplified block diagram of a pulse code modulated digital automatic branch exchange for a telephone network, constructed in accordance with a preferred embodiment of the present invention.

Basic Organization of the Exchange, FIG. 1

FIG. 1 illustrates, in block diagram form, a multiport pulse code modulated digital automatic exchange 40 constructed in accordance with one preferred embodiment of the present invention. As shown in FIG. 1, the pulse code modulated exchange 40 comprises two interconnected and interrelated systems. These are an input-/output system 41 constituting that portion of exchange 40 to the left-hand side of phantom line 43, and a synchronous transfer system 42 constituting the remainder of exchange 40, located to the right of line 43.

The input/output system 41 of exchange 40 includes line connection means for a multiplicity of N communication ports. A part of the line connection means is a main distribution frame 44 that affords external connections to individual telephones and to trunks from a central office. As illustrated, the main distribution frame 44 is equipped to provide external connections for two hundred forty communication ports such as individual telephones T101, T102, T116, and T340, and a typical trunk T330. The communication ports themselves are generally represented by reference characters P101 through P340, with one port connection for each telephone or trunk made externally of the main distribution frame 44. Thus, for exchange 40, N=240. With this number of ports, exchange 40 is usually used as a private automatic branch exchange (PABX). However, as will be apparent from the description provided hereinafter, exchange 40 can be readily and effectively expanded to handle much larger numbers of communication ports; for a telephone system the number N of communication ports may be as large as several thousand.

The first sixteen communication ports P101 through P116 from main distribution frame 44 are connected to a first data distribution module 45. In exchange 40 there are a a total of fifteen data distribution modules 45, each connected to sixteen communication ports to accommodate the two hundred forty ports controlled by the exchange. Only two of the data distribution modules 45 are shown in FIG. 1 and the data distribution module at the bottom of the figure is illustrated in greatly simplified form as compared with that in the upper portion of the drawing because each of the data distribution modules 45 is a replica of the others.

Within each data distribution module 45 there are three principal circuit units, a data conversion unit 46, a master path control unit 47, and a communication interface adapter unit 48. Each data conversion unit 46 is individually connected to sixteen of the communication ports, as shown by the individual connections for ports P101, P102, and P116. The communication interface adapter unit 48 in each data distribution module 45 is also provided with individual connections to each of the ports served by that data distribution module. This interconnection is shown only generally by a bus 49. In each data distribution module, a bus 51 connects the communication interface adapter unit 48 to the master path control unit 47. Three buses 52, 53 and 54 interconnect the data conversion unit 46 in each data distribution module 45 with the master path control unit 47 in the same module. The fifteen data distribution modules 45, each serving sixteen communication ports, together with main distribution frame 44, constitute the complete input/output system 41 of exchange 40.

Each port P101 comprises a balanced conductor pair, coming from the main distribution frame 44, and requires translation to a four conductor transmit/receive pair going through the various circuits of the data conversion unit 46 to which the port is connected. In each data conversion unit 46, this translation is effected by the combination of a subscriber line interface circuit (SLIC) and a transmit/receive filter (TRF) shown as a combination SLIC/TRF circuit 55 for each port in the data conversion unit 46 in the upper left-hand portion of FIG. 1. Circuits 55 are a part of the line connection means for exchange 40.

Each SLIC/TRF 55 in each data conversion unit 46 has an output connection 56 to an input multiplexer 57; though shown as a single line, the output connection 56 is actually a conductor pair. Each SLIC/TRF 55 further has an input connection 58 from an output de-multiplexer 59; again, the connection 58 is a conductor pair. In addition, each SLIC/TRF 55 in each data conversion unit 46 affords a hook switch output connection 61 to a conversion control circuit 62 incorporated in the data conversion unit 46.

Multiplexer 57 may actually comprise two multiplexers, each serving eight ports as described more fully hereinafter. The multiplexer has an output connection 63 to the input of an analog-to-digital input converter 64. Again, there may actually be two input converters 64, each serving eight communication ports and each provided with its own sample/hold circuit. Conversely, the input 65 to de-multiplexer 59 comes from a digital-to-analog output converter 66. Again, in the preferred construction output converter 66 may incorporate two digital-to-analog converters each serving eight ports and de-multiplexer 59 may also constitute two de-multiplex circuits each serving eight ports.

Conversion control circuit 62 incorporates a plurality of timing and control circuits, discussed more fully below in connection with FIG. 2, that control the operations of multiplexer 57, de-multiplexer 59, A/D converter 64, and D/A converter 66; by the same token, the conversion control circuit 62 requires information about the operational state of each of the circuits that it controls. Thus, there are both input and output connections from conversion control circuit 62 to each of the devices that it controls, as generally indicated by the two-way circuit connections 67,68, 69 and 71 in FIG. 1. More specific information regarding a typical arrangement for these internal control connections within data conversion unit 46 is provided in FIG. 2.

The master path control unit 47 in each of the data distribution modules 45 includes data storage means, shown in FIG. 1 as comprising an input data store 72 and an output data store 73. Data store 72 receives information from the A/D input converter 64 through bus 53. The output data store 73 supplies data to the D/A output converter 66 through bus 54. The output of the input data store 72 is connected to a data bus 74 that comprises one of six buses in transfer system 42; those buses constitute the critical interconnections between the transfer system 42 and the input/output system 41. The output data store 73 has an input connection from data bus 74 and has an alternate input connection from a tone data bus 75.

Each master path control unit 47 in each of the fifteen data distribution modules 45 of exchange 40 also comprises a path control circuit 76 affording a multiplicity of control and status interconnections between input/output system 41 and transfer system 42. Path control circuit 76 controls the addressing and the timing for recording and readout of data in the storage means comprising input data store 72 and output data store 73. The control connections from path control circuit 76 to input data store 72 and output data store 73 are generally indicated by two buses 77 and 78, respectively.

Figure 3:
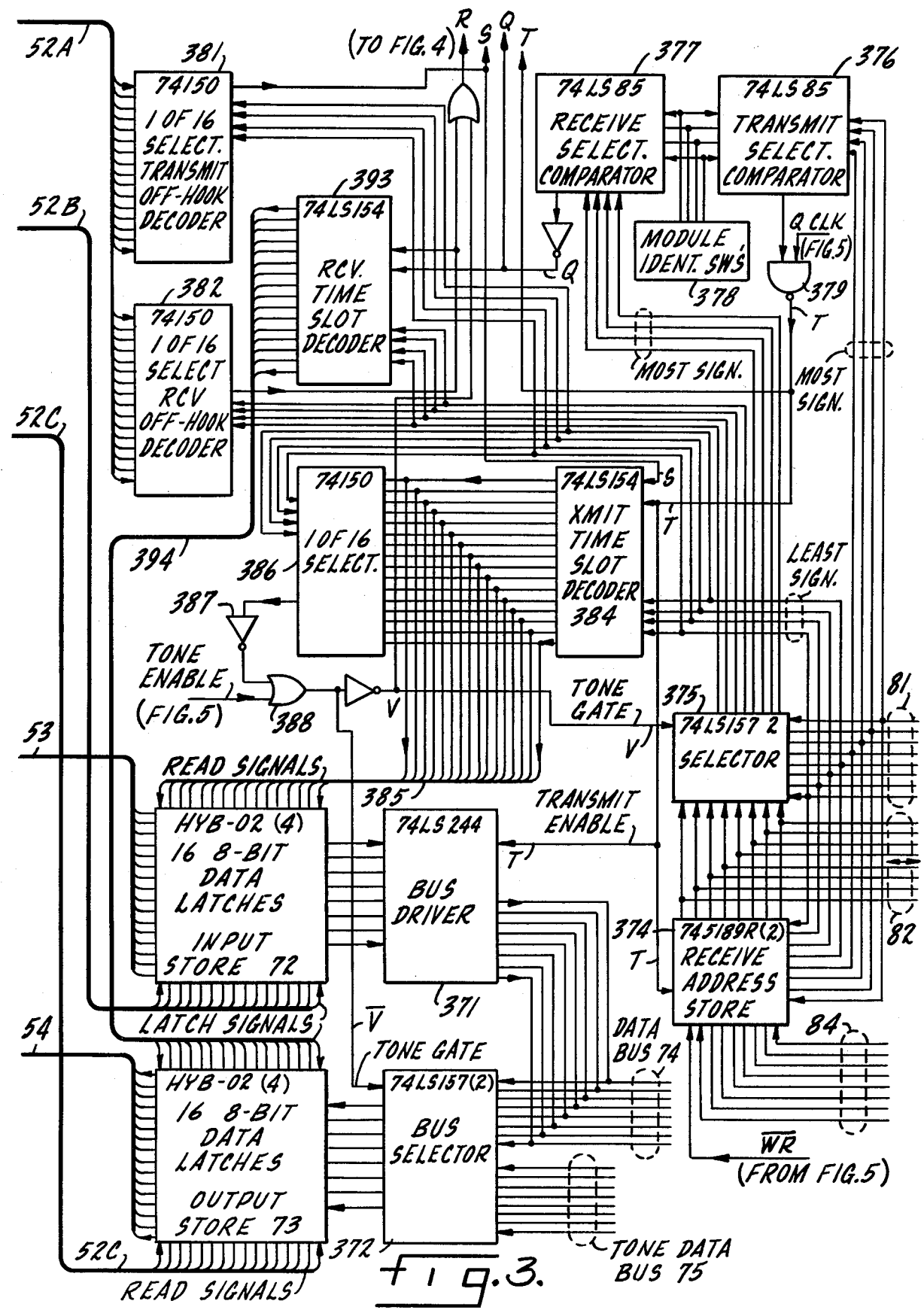
Figure 4:
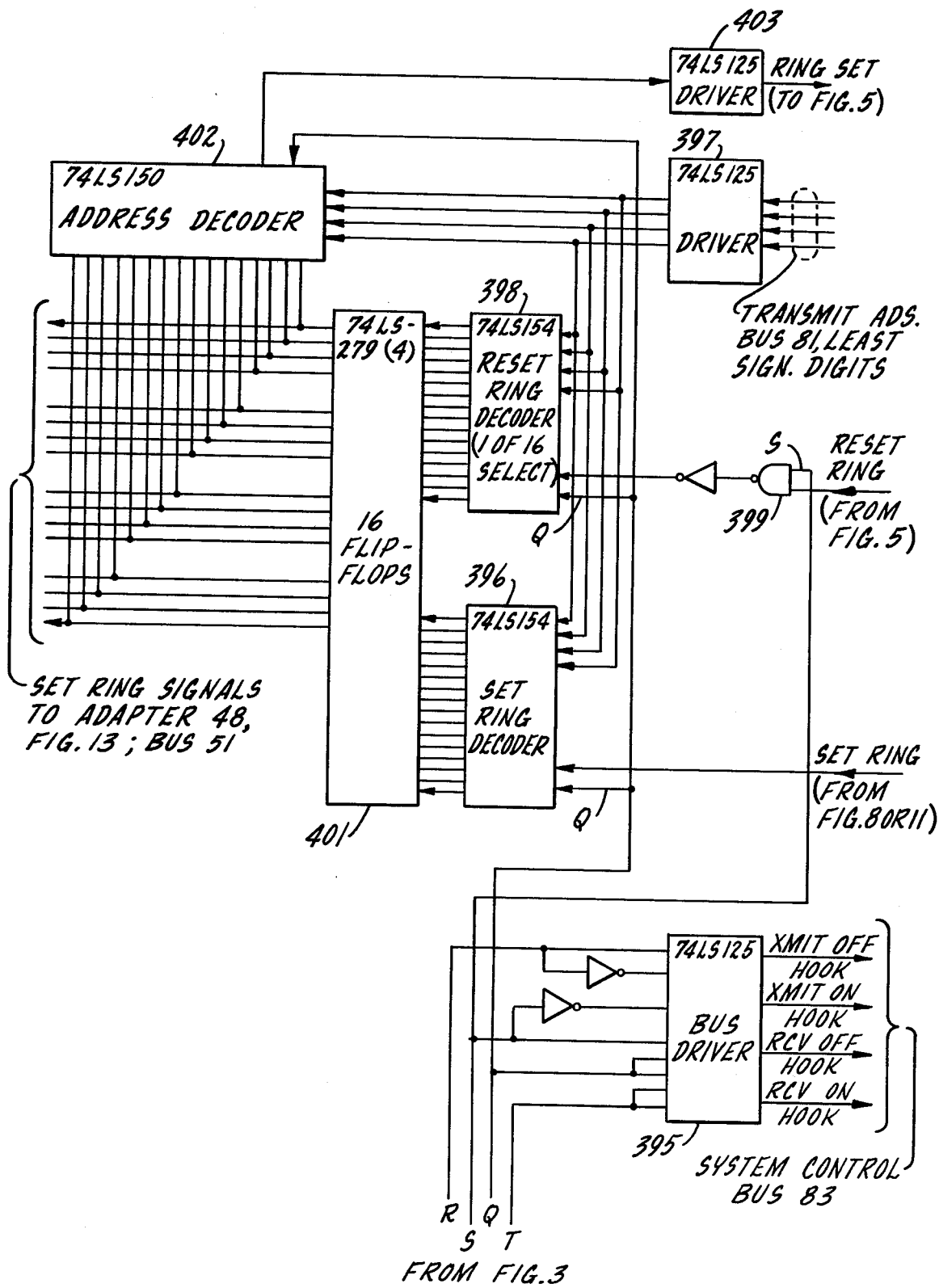

Path control circuit 76, for which a specific operating circuit is shown in FIGS. 3 and 4, constitutes the principal interface between input/output system 41 and transfer system 42 of exchange 40. The path control circuit must include circuitry for receiving information, from conversion control circuit 62, identifying individual communication ports served by module 45 that are involved in calls to other ports of exchange 40. This information, in part, is supplied to path control circuit 76 through bus 52. The path control circuit 76 includes a memory for recording the addresses of calling ports, sometimes referred to as transmit addresses, and further comprises a memory for recording addresses of called ports, sometimes referred to as receive addresses.

The path control circuit 76 serves to control the communication interface adapter unit 48, through bus 51, to enable unit 48 to supply ring signals to those ports P101 through P116 connected to the particular data distribution module 45 in which the path control circit is incorporated and to perform other related functions. Furthermore, each path control circuit 76 supplies the transfer system 42 of exchange 40 with information regarding the operating condition of each of the communication ports connected to the data distribution module 45 in which that path control circuit is incorporated. For exchange of information within transfer system 42, each path control circuit 76 is connected to a transmit address bus 81, a receive address bus 82, a system control bus 83, and an auxiliary receive address bus 84, sometimes called a memory data bus. Each of those buses is a part of the transfer system 42.

The communication interface adapter unit 48 that is incorporated in each data distribution module 45 in the input/output system 41 of exchange 40 is the simplest of the operating units in the data distribution module. The communication interface adapter unit 48 includes sixteen ring signal relays, one for each of the ports served by the data distribution module in which it is incorporated. Unit 48 is connected to a ring signal generator, not shown in FIG. 1, that is common to all of the data distribution modules 45 in exchange 40. A bus 49 is shown between communication interface adapter unit 48 and main distribution frame 44 for connection to the individual telephones or trunks served by module 45, bypassing the SLIC/TRF circuits 55 when ring signals are supplied to the individual telephones. The bypass connections may actually be made within data distribution module 45. The communication interface adapter unit 48 is not required in systems that utilize tone ringing, but is shown as a part of exchange 40 because the majority of telephones in service require a high voltage ring signal that must be isolated from circuits 55.

As previously noted, transfer system 42 serves all of the data distribution modules 45 of the input/output system 41 in exchange 40. Transfer system 42 comprises a master control module 91 and two or more address decoder modules 92; only one module 92 is shown. All of the modules 91,92 are connected to all of the principal operating buses, including data bus 74, tone data bus 75, transmit address bus 81, receive address bus 82, system control bus 83, and memory data bus 84. For the two hundred forty port exchange 40 illustrated in FIG. 1, each of these buses, with the possible exception of system control bus 83, may comprise an eight wire bus adapted to the transmission of parallel digital data signals each comprising M bits, where M=8. For an exchange in which the number of ports served (N) exceeds two hundred fifty-six, the size of transmit address bus 81, receive address bus 82, and memory data bus 84 may be increased to accommodate larger addresses; thus, for an exchange in which N=480, nine-conductor buses may be used, and for N=960, ten-conductor buses are suitable. The configuration of system control bus 83 is subject to greater variation, as will be apparent from the more detailed description provided below; in the illustrated exchange, an eight conductor bus is adequate.

The master control module 91 of transfer system 42 includes a master clock 93 comprising a high frequency oscillator and countdown circuits connected to that oscillator to provide appropriate timing signals. For the illustrated exchange 40, with N=240, the maximum operating frequency required for clock 93, used to control the overall scan of the operating conditions and data for all ports in transfer system 42 as described hereinafter, may typically be 2.048 Megahertz. For an exchange configured to handle four hundred eighty ports, that maximum operating frequency would be increased to, typically, 4.096 mHz. For an exchange having nine hundred sixty communication ports, the operating frequency for master clock 93 would be 8.192 mHz.

In master control module 91, there are a series of connections, shown as a bus 94, connecting master clock 93 to a master sequence control unit 95. The master sequence control unit 95 is connected to all of the principal buses in transfer system 42, including data bus 74, tone data bus 75, transmit address bus 81, receive address bus 82, system control bus 83, and the auxiliary receive address bus 84. Within the master control module 91, there is also a main processor unit 96 typically comprising a microprocessor, a program control memory preferably comprising a programmable read-only memory (PROM) and a random access memory (RAM) of moderate size. The main processor unit 96 is connected to master sequence control unit 95 by a bus 97 and is also provided with an RS-232C connection 98 to an external operator console (not shown). It is appropriate to note that MPU 96 is the only major portion of transfer system 42 that does not function at the 2.048 mHz (or higher) rate of the main transfer operations established by clock 93; the MPU functions take much longer time intervals.

Figure 5:
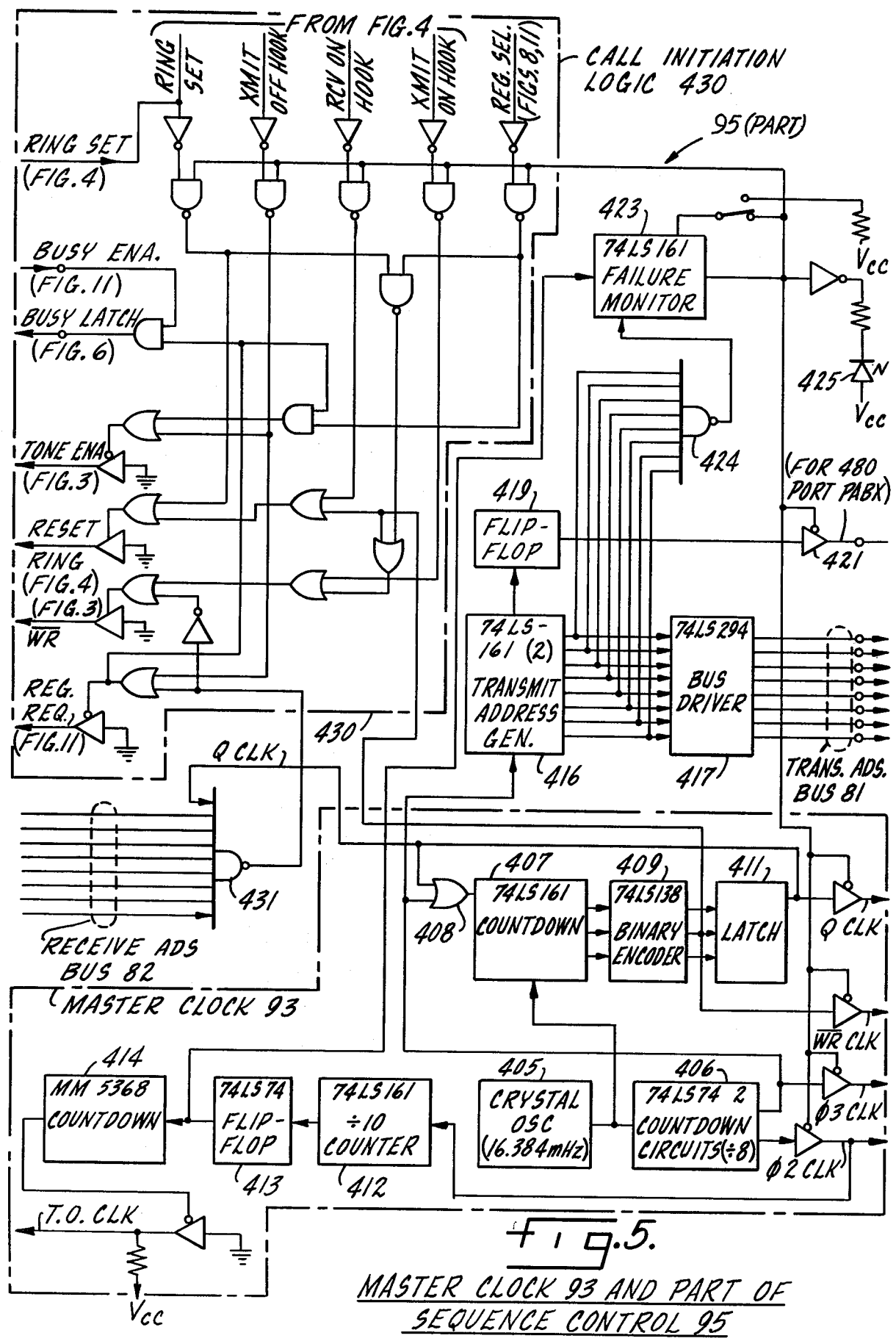

The master sequence control unit 95, described more fully below in connection with FIGS. 5-8, incorporates a transmit address signal generator (FIG. 5) that generates a continuous cycle of sequential multi-bit parallel digital data words constituting transmit addresses for each of the ports P101–P340, for a plurality of tone registers described hereinafter, and for the operator's console. Those transmit addresses are supplied to transmit address bus 81, in this instance an eight-bit bus. The master sequence control also includes a conventional tone generator (FIG. 6) for developing dial tone, busy tone, and ringback tone signals, and conversion circuits for converting those tone signals to eight-bit parallel digital signals for transmission over the tone data bus 75 (dial tone and busy tone) and the data bus (ringback tone). Comparators in the master sequence control unit 95 are provided to compare transmit addresses from bus 81 with an operator position address and with addresses supplied by MPU 96 to generate outputs from the memory data (auxiliary receive address) bus 84 and also to generate control signals for transmission on bus 83 (FIGS. 7 and 8). The master sequence control unit also monitors port status conditions to develop a variety of control signals for control of ring functions, transmission of tone signals, etc. (FIG. 5).

Each address decoder module 92 of transfer system 42 includes a tone register control unit 86 that is connected to all of the buses 74, 75, and 81–84. Each module 92 further includes a plurality of tone registers 87 each connected to the tone register control unit 86 as shown by the internal buses 88. The number of tone registers provided in each address decoder module 92 of transfer system 42 may vary, depending in part upon the level of traffic anticipated through exchange 40 and such other considerations as the available physical space. In a typical PABX for which N=240, there may be six of the tone registers 87 in each of two address deocoder modules 92, thus giving a total of twelve tone registers.

Each tone register 87 (FIG. 10) incorporates a touch tone decoder for translating touch tone (dial) signals to a form suitable for comparison with transmit addresses as employed in transfer system 42, together with storage capacity and the requisite comparators to identify a called port, with output connections to the auxiliary receive address bus 84. The tone register control unit 86, illustrated primarily in FIGS. 11 and 12, includes circuits for conversion of M-bit parallel digital data signals representative of touch tone dialing signals back to their original tone signal form for use in tone registers 87 (see FIG. 12) and a variety of comparators and other logic circuits to control the tone registers (FIG. 11), with a number of control outputs to system control bus 83.

Calls Through exchange 40, FIG. 1

In considering the operation of the pulse code modulated digital exchange 40 as thus far described in connection with FIG. 1, it is first assumed that a party having access to telephone T101 desires to place a call to a party at telephone T116. As usual, the call is initiated by the calling party picking up the handset of telephone T101. The telephone network in which instruments T101 and T116 are incorporated is of conventional configuration. Consequently, when the handset at telephone T101 is lifted, the apparent impedance across the tip and ring connectors of port P101 changes from an effectively infinite impedance to approximately 600 ohms; this change of condition from on-hook to off-hook is detected in the SLIC/TRF circuit 55 connected to port P101. As a consequence, circuit 55 supplies an off-hook signal to conversion control circuit 62, through its hook switch line 61. Actually, as soon as the handset for telephone T101 is lifted by the calling party, the voltage level on line 61 from the SLIC for port P101 changes from an on-hook level to an off-hook level, and the off-hook level on conductor 61 is maintained as long as the handset at telephone T101 remains off-hook.

The conversion control circuit 62 continuously scans the operating levels of the hook switch lines 61 from all of the sixteen ports served by the data distribution module 45 in which circuit 62 is incorporated. The rate for this scanning operation is taken as the basic sampling rate required for effective analog to digital and digital to analog conversion in circuits 57 and 59, with an assumed maximum analog input frequency of four KHz, requiring a scan rate of eight KHz. For the illustrated exchange, with multiplexer 57 and demultiplexer 59 each comprising two circuits each serving eight ports, the maximum frequency required to obtain this scanning rate is 64 KHz.

The fact that telephone T101 has gone off-hook, establishing an off-hook condition for port P101, is also signalled to path control circuit 76 by way of bus 52. The off-hook condition for port P101 is recorded in path control circuit 76, to be available for transmission over system control bus 83.

In transfer system 42, master sequence control unit 95 controls a continuous scanning of all of the path control circuits 76 in accordance with a predetermined transfer time cycle having a multiplicity of transfer time slots; there is a particular time slot assigned to each port P101–P340 of PABX 40. Thus, when the time slot for the transmit address assigned to port P101 is next reached in the scanning cycle of master sequence control unit 95, the transmit address for that port, constituting an eight bit digital word coded to identify port P101 is output on the transmit address bus 81 from path control 76. At the same time, an off-hook signal is applied by path control circuit 76 to one of the lines in the system control bus 83. As noted above, the synchronous scanning rate for transfer system 42 may be 2.048 mHz, affording a useful time slot of the order of 400 nanoseconds. From this point on, during each time slot assigned to port P101 in each successive scan in transfer system 42, when the transmit address for port P101 appears on transmit address bus 81 an off-hook condition for that port is signalled via the level of one of the conductors in system control bus 83. Accordingly, in each such time slot the master control unit 95 and the tone register control units 86 receive signals indicating that port 101 is in an off-hook condition.

When the off-hook condition for port P101 is first signalled to master sequence control 95, the signal levels on other conductors in system control bus 83 enable control 95 to determine that the only significant operational characteristic for port P101, at that instant, is the fact that it has gone off-hook. That is, the master sequence control, in scanning system control bus 83, is able to determine that there is no other telephone called from port P101 that has gone to an off-hook condition, that there is no ringback condition set, etc. As a consequence, master sequence control unit 95 immediately outputs a register request signal, on another portion of the system control bus 83, to the tone register control units 86. The tone register control units determine whether one of the tone registers 87 is available for use. If all of the tone registers are currently in use, an operating condition that is unlikely but always possible, a "busy" condition is established as described below. Most frequently, one of the tone registers 87 is available and is immediately seized for subsequent operations, both in the time slot assigned to port P101 and in a time slot assigned to that particular tone register. Each tone register 87 has its own individual time slot in transfer system 42 with its own transmit address, just like the individual transmit addresses and time slots for the communication ports.

With one of the tone registers 87 thus identified as available and seized for subsequent use, the related tone register control 86 outputs a signal to master sequence control 95, again on the system control bus 83, indicating that a tone register has in fact been made available for port P101 and also identifying the particular tone register seized for that purpose. The master sequence control 95, in turn, causes the transmit address assigned to that tone register and identifying its time slot, in the form of an eight bit parallel digital word, to be supplied to path control circuit 76 over memory data bus 84, the tone register transmit address being recorded in circuit 76 for subsequent, temporary use as a receive address for port P101.

In the course of the continuing data transfer scan in system 42, when the time slot for the tone register 87 that has been seized for use with port 101 occurs, master clock control unit 95 supplies a dial tone to the tone data bus 75. All data transmission within transfer system 42 is in eight bit parallel digital form, and the dial tone is treated in the same manner as any other data. Thus, the dial tone, as transmitted on tone data bus 75, is in the form of an eight bit parallel digital word; this information is recorded in a location in output data store 73 dedicated to port P101, under the control of path control circuit 76.

This recorded tone data is scanned, in data distribution module 45, at the same leisurely rate (8 KHz) as described above, under the control of conversion control circuit 62. Thus, in those portions of the scanning cycle of data distribution module 45 constituting the output interval for port P101, the digital dial tone data recorded in output data store 73 is supplied on bus 54 to output converter 66 and there converted to an analog dial tone signal supplied through de-multiplexer 59 and connection 58 to the SLIC/TRF circuit 55 connected to port P101. At this juncture, therefore, a dial tone is output on port P101 to telephone T101 and is heard by the person endeavoring to make a call from that telephone. To the perception of the party at telephone T101, the dial tone starts as soon as the telephone goes off-hook and is continuous as long as the dial tone information is maintained in storage in the portion of output data store 73 that is dedicated to port P101. That stored dial tone data is re-recorded once in each cycle of transfer system 42.

All of the foregoing operations occur in a maximum time interval corresponding to the overall system scan rate of transfer system 42, that maximum time interval being 400 nanoseconds. Of course, several such time intervals elapse before the user of telephone T101 is able to react and dial the first number of the address of the telephone to be called. For the assumed call from T101 to T116, the party at telephone T101 now dials the first number in the address for the called telephone T116. As a consequence, the usual dual tone representative of the dialing numeral "one" is applied to the input of the SLIC/TRF circuit 55 connected to port P101. With conversion control circuit 62 actuating multiplexer 57 at the eight KHz rate for operational timing in data distribution module 45, the tones representative of the first number in the called station address are supplied to input converter 64 and there converted to an eight bit digital data representation of the tones. That eight bit digital word is recorded in a portion of input data store 72 dedicated to information transmitted to exchange 40 from port 101, to be available for use in transfer system 42.

In the transmit time slot for port P101, the initial number of the address for telephone T116 is read out of input data store 72 onto data bus 74, again as an eight bit parallel digital word. From bus 74, this digital data signal is supplied to tone register control unit 86, which decodes the digital representation of the first number in the address for the called telephone T116, reconstituting the dialed information in the same dual tone form that it had when it was input to exchange 40. In this form, the dialed information is supplied to the seized tone register 87 and recorded there. In the course of the same transfer system time slot (the time slot of port P101) tone register control unit 86, by way of system control bus 83, signals the master sequence control 95 to discontinue the dial tone output previously maintained on tone data bus 75; in succeeding cycles of transfer system 42, the dial tone information is no longer recorded in that portion of output data store 73 allocated to port P101. As a consequence, the caller at telephone T101 no longer hears the dial tone and knows that the initial dialling action has been effective.

The calling party at telephone T101 subsequently dials the remaining numerals one and six, in sequence, to complete dialing in the address of the called telephone T116 at port P116. This information is translated through data conversion unit 46, under control of master path control unit 47, to transfer system 42, in the manner previously described, and the two additional tone representations needed for the complete address of the called telephone T116 are thus recorded in the seized tone register 87.

As described more fully hereinafter, the recording of the address of the called telephone T116 in the seized tone register 87 may be accomplished in binary coded decimal form. In the tone register, the recorded information identifying the called telephone is compared with each transmit address appearing sequentially on the transmit address bus 81, translated to BCD format; the seized tone register is connected to bus 81 through tone register control unit 86.

When the tone register 87 identifies a match between the recorded address of the called party and the continuously changing addresses on the transmit address bus 81, that match is signalled to and recorded in the tone register control unit 86, which immediately outputs the called station transmit address, identifying the time slot for port P116, on the receive address bus 82 for recording as a receive address for port P101, in the path control circuit 76 associated with port P101. Thus, the address of port P116 now replaces the tone register address as the receive address for port P101. Furthermore, the transmit address of the calling party, port P101, is output by tone register control unit 86 on the memory data bus 84 and is also recorded in path control circuit 76 as the receive address for port P116. With the transmit addresses identifying the time slots for both the calling port P101 and called port P116 each recorded in path control 76 as a receive address for the other port, the path control circuit is able to maintain a time-based interlock between ports P101 and P116, as regards operation of transfer system 42; the transfer system time slot assigned to port P101 as its transmit time slot is effectively maintained as the receive time slot for port P116, and the transfer system transmit time slot for port P116 is made the receive time slot for port P101.

All bused information goes to master sequence control unit 95 in transfer system 42. Thus, the master sequence control is able to determine that a match has been made between the calling and called ports and functions to supply a ring relay set signal, via system control bus 83, path control circuit 76, and bus 51, to the communication interface adapter unit 48. This establishes a busy condition for port P116 (busy conditions are discussed more fully hereinafter) and sets a ring relay, in the communication interface adapter 48, that is connected to port P116. That relay, when set, switches the two conductors of port P116 from the normal connection to the SLIC/TRF circuit 55 for that port and connects the incoming line from telephone T116 to a ring signal generator, supplying a conventional twenty Hz ninety volt (peak to peak) ring signal to telephone T116.

Furthermore, as long as telephone T116 remains on-hook, during each of the transmit time slots of the transfer system 42 assigned to port P116, the time slots that are now assigned as receive time slots for port P101, the master sequence control 95 outputs a ringback tone on the data bus 74, which is supplied to port P101 in the same manner as described above for the dial tone signal, to enable the caller at telephone T101 to know that the called telephone T116 is ringing.

In a normal situation, the next action that occurs is the lifting of the handset at telephone T116 by some person who has heard the telephone ringing. This has no effect on the SLIC/TRF circuit 55 connected to port P116, because port P116 has been disconnected from the line to telephone T116. However, the resulting change in the effective impedance across the line from telephone T116 is detected in the communication interface adapter unit 48 and utilized to trip the ring relay in adapter 48 so that the line from telephone T116 again becomes connected to port P116 and thus to the SLIC/TRF circuit 55 for that port. Since circuit 55 now sees an off-hook condition for port P116, it supplies an off-hook signal to conversion control circuit 62, on the appropriate hook switch conductor 61, and that off-hook signal is supplied to the master sequence control unit 95, through path control circuit 76 and system control bus 83, as described above for the initial off-hook signal from port P101. The call connections are now completed.

Audio Transmission Through exchange 40

The tranmission of audio data through exchange 40, in the course of a call, is based upon the time slot interlock for the two ports involved, ports P101 and P116 in the present instance. Audio signals from telephone T101 are supplied to the associated SLIC/TRF circuit 55 through the port P101 to which the telephone is connected. Those audio signals are time-multiplexed with signals from the other ports served by the same data distribution module 45, in multiplexer 57, and are converted to parallel M-bit digital data form in converter 64. Each M-bit digital data signal, constituting a pulse code modulated digital signal representative of the audio from port P101, is recorded in a storage location in input data store 72 dedicated to that port. In transfer system 42, the data is read out of input data store 72 as a parallel M-bit digital word and is transferred to a storage location in the output data store 73 assigned to port P116. This data transfer occurs in the transmit time slot permanently assigned to port P101, which has become established as the receive time slot for port P116 for the duration of the call. From output data store 73, in accordance with the much slower cycling rate for data distribution module 45, the digital audio information is read out to output converter 66 as an M-bit group of digital pulses, re-converted to an analog audio signal, and supplied to port P116 and telephone T116 through de-multiplexer 59 and the SLIC/TRF circuit for port P116.

The transition of audio signals from telephone T116 to telephone T101, through exchange 40, proceeds in the same manner except for the timing involved. Briefly, the audio signals from telephone T116 are supplied to the SLIC/TRF circuit 55 connected to port P116 and thence to multiplexer 57 and the A/D converter 64, which records the resulting digital signal in a storage location in input data store 72 store dedicated to port P116. In the transmit time slot for port P116, transfer system 42 shifts the M-bit parallel digital data signal representative of the audio data from store 72 to store 73, recording the M-bit digital word in a location in store 73 that is dedicated to port 101. From there, with timing determined by the operating cycle for data distribution module 45, the digital audio signal is converted to analog form in output converter 66 and supplied to port P101 through de-multiplexer 59 and the appropriate SLIC/TRF circuit 55.

From the foregoing description, it will be apparent that all transmission of data through transfer system 42, going from port P101 to port P116, occurs during the transfer system time slot permanently assigned as a transmit time slot for port 101. Conversely, all transfer of data going from port P116 to port P101, through transfer system 42, occurs in the transmit time slot permanently assigned to port P116. That is, at a 2.048 mHz scan cycle rate for transfer system 42, appropriate to a system having two hundred fifty-six time slots, the effective time for data transfer in system 42 of exchange 40 is of the order of 400 nanoseconds. On the other hand, in the data distribution modules 45, the transfer and conversion operations proceed at a much more leisurely pace. At the effective eight Khz scanning rate employed in the data distribution modules, the available time for conversion At the effective eight Khz scanning rate employed in the data distribution modules, the available time for conversion operations, which governs the time available for recording data in input store 72 and for readout of data from output store 73, is approximately one hundred twenty-five microseconds. It is this distintive differential in operating cycle times for the two main sections of exchange 40, the input/output system 41 and the transfer system 42, that enables the exchange to handle a large number of ports effectively and efficiently while minimizing the number of components required, the number of internal paths within the exchange, and the overall cost and size of the exchange.

Indeed, and as previously noted, exchange 40 can be readily expanded to incorporate a much larger number of ports with no major modification of transfer system 42 apart from an increase in the scanning frequency, sizing of the buses to accommodate the number of digits required for the port addresses, and the addition of address decoder modules sufficient to accommodate the added traffic. In this manner, exchange 40 can be readily enlarged to accommodate five hundred, one thousand, or many more ports. It should be noted that increasing the size of exchange 40 to accommodate large numbers of additional ports does not entail any requirement for change of the effective eight KHz scanning rate for the data distribution modules 45 of the input/output system 41. Stated differently, because the input/output system 41 is essentially asynchronous in relation to the scanning rate of the synchronous transfer system 42, an increase or decrease in the number of ports served by exchange 40 can be accomplished without modification of the circuits or the operating frequencies employed in the input/output system 41.

Termination of a Call

When the telephone call between telephones T101 and T116 is finished, one of the parties hangs up. Assuming that telephone T101 is the first that is returned to an on-hook condition, this results in the effective impedance across the conductors of port P101 changing from a condition of approximately 600 ohms to an effective impedance of infinity. This change is detected by the SLIC/TRF circuit 55 connected to port P101 with the result that the voltage level on the hook switch conductor 61 from that circuit to conversion control circuit 62 changes level, back to its original on-hook condition. The on-hook condition for port P101 is transmitted to path control circuit 76 and appears as an on-hook signal on a part of system control bus 83, identifying port P101 as having changed to an on-hook condition during its transmit time slot in the next succeeding cycle of the transfer system 42.

In that same time slot of transfer system 42, master clock control unit 95 supplies an output, on memory data bus 84, that is effective to record an M-bit data word consisting entirely of zeros in the receive address store in path control circuit 76 in which the address for the called telephone, in this instance telephone T116, connected to port P116, has previously been recorded. This effectively breaks the interlock previously maintained between the two ports P101 and P116; the transmit time slot for port P116 that had been recorded as the receive time slot for port P101 is no longer available in path control circuit 76. The same action takes place if it is telephone T116 that is first placed on-hook, except that in this instance it is the recorded transmit address of port P101, stored as the receive time slot for port P116, that is replaced with a recording of all zeros. As read out, this "all zero" recording is converted to all "ones".

Calls Between Different Data Distribution Modules

The foregoing description of placement, completion, and termination of a telephone call between ports P101 and P116 applies equally to any pair of ports of exchange 40 connected to individual telephones, regardless of whether the ports are both connected to one data distribution module 45 or are served by different data distribution modules. For example, a party at telephone T102 may desire to place a call to telephone T340. For this call, when telephone T102 goes off-hook and port P102 changes from an effective impedance of infinity to approximately 600 ohms, the off-hook condition for port P102 is signalled to conversion control circuit 62 and path control circuit 76 in the data distribution module 45 for port P102 as previously described. As before, the off-hook condition for port P102 is recorded in its path control circuit 76; in the transmit time slot of transfer system 42 for port P102, the transmit address of port P102 and its off-hook condition are identified by master sequence control 95 to initiate a request for a tone register directed to the address decoder modules 92. Assuming a tone register is available, control 95 completes a transmission path back to port P102 for a dial tone signal, on tone data bus 75, originating from the master sequence control unit. Again, the transmission of the dial tone, in digital form, in transfer system 42 occurs in a transfer time slot assigned to the tone register 87 that has been seized for use in connection with this call, and the time slot address for that tone register is temporarily recorded in the path control circuit 76 of the data distribution module 45 serving port P102.

Dialing of the address of the called station, in this instance telephone T340, proceeds as described above, with the same operational effects. The dial tone is interrupted after the first numeral of the called port address (P340) has been dialed. The dial tones for the three numerals of the called port address, 340, are recorded in the seized tone register 87; storage may be in binary coded decimal form. As before, in the tone register the recorded information identifying the called telephone is continuously compared with each address appearing on the transmit address bus 81 in the succeeding cycle of transfer system 42 until a match is identified with the transmit address, and time slot, for port P340.

In the transfer system time slot for port P340, when a match is found, the tone register control unit 86 outputs the called station address on the auxiliary receive address bus 84, the memory data bus, for recording in the path control circuit 76 associated with port P102, as a receive address for that port. Furthermore, the address of the calling port P102 is output from storage by tone register control unit 86 onto the memory data bus 84 and is recorded in the path control circuit of the master path control unit 47 in the data distribution module 45 serving port P340 as the receive address for that port. Thus, with the transmit address for port P102 recorded as the receive address for port P340 and the transmit address for port P340 recorded as the receive address for port P102, the same interlock is effected for ports P102 and P340, for this call, as in the case of the call between ports P101 and P116 described above.

When the call is established, but before telephone T340 is taken off-hook, the master sequence control 95 outputs a ringback tone on the data bus 74 during each transmit time slot for port P340, which is the receive time slot, under those conditions, for port P102. When telephone T340 goes off-hook, the telephone is connected to the communication interface adapter unit 48 in its distribution module 45, since a ring signal has been applied to the telephone from the adaptor 48 as previously described. The change of telephone T340 to an off-hook condition is detected in the communication interface adapter unit, the ring relay for telephone T340 is tripped, and the telephone is re-connected to its port P340. The data conversion unit 46 serving port P340 now finds an off-hook condition for that port, a condition that is recorded in master path control unit 47 and signalled to the transfer system 42, on system control bus 83, in the appropriate time slot for port P340. The call connections are now complete, just as in the first example.

Audio transmission through PABX 40 for a call from port P102 to port P340 proceeds exactly as described above for a call between ports P101 and P116 except that two data distribution modules 45 are now involved instead of just one. Thus, audio signals from port P102 are multiplexed and converted to pulse code modulated parallel M-bit digital form in the data conversion unit 46 of the distribution module 45 to which port P102 is connected. Each M-bit digital data signal representative of the audio input to port P102 is recorded in the input data store of the master path control unit 47 serving port P102. Transfer system 42 reads that data out as a parallel M-bit digital word and transfers it to the output data store in the master path control unit 47 serving port P340 in the time slot assigned as a transmit time slot for port P102, which is now the receive time slot for port P340. The digital audio information is read out of storage and again converted to analog form and supplied to port P340 by the data conversion unit 46 serving that port in the same manner as described above. The reverse procedure carries audio information from port P340 to port P102, with the transfer in system 42 occurring during the permanently assigned transmit time slot for port P340, currently established as the receive time slot for port P102. As before, all transmission of data through transfer system 42, between ports P102 and P340, occurs in the transmit time slots permanently assigned to the two ports, each of those time slots being of the order of 400 nanoseconds. Also as before, the transfer and conversion operations performed in the data distribution modules 45 serving these two ports proceed at a much more leisurely pace, determined by the effective eight Khz multiplex scanning rates for these distribution modules.

Busy Conditions in Exchange 40

As previously noted, the number of address decoder modules 92 incorporated in a particular pulse code modulated digital exchange such as exchange 40 can be varied, depending upon anticipated traffic levels. For a transfer system 42 having two hundred fifty-six time slots in transfer system 42 and operating at a transfer scanning rate of 2.048 MHz, as described, and using address decoder modules each incorporating six tone registers 87, two address decoder modules are generally satisfactory; the twelve tone registers 87 thus provided are adequate for most traffic conditions. Since each tone register 87 must have its own time slot, this reduces the available number of port time slots to two hundred forty-four. If four of those time slots are assigned for use by an operator's console, to be used in holding calls and for like functions, a total of two hundred forty external ports can be accommodated. If higher traffic levels are anticipated, an additional address decoder module 92 may be added to the system; if this is done, the number of external communication ports must be reduced so that transmit time slots will be available for the added tone registers.

Under any circumstances, however, there is always the possibility that at any given moment all of the tone registers 87 will be in use, though this occurrence is rare in a PABX or other exchange provided with sufficient tone register capacity. When this unusual condition does occur, in the transmit time slot for a telephone attempting to make a call through exchange 40, there is no signal on system control bus 83 to master sequence control 95 from any of the tone register control units 86 to indicate that a tone register has been seized, since none is available. In this circumstance, the master sequence control unit supplies a busy tone output on tone data bus 75, to the portion of output data store 73 assigned to the calling port, in the data distribution module 45 serving that port. This action need not occur instantaneously; activation of the busy tone output from master sequence control 95 is preferably delayed for a substantial number of cycles of transfer system 42 to provide a reasonable period for location of a tone register 87 that may become free for use during the delay interval. However, if a tone register cannot be seized during this interval, the busy tone is transmitted back to the calling port, in the manner described above, to inform the calling party that the call cannot be completed through exchange 40 at this particular time.

Another busy condition occurs if the called port is already in use. For this condition, when a match between the dialed-in address for a called port, as recorded in one of the tone registers 87, is identified by the tone register, the fact that the called port is already off-hook is signalled on the system control bus 83 simultaneously with the determination of the match, since the latter occurs during the transmit time slot permanently assigned to the called telephone. The concurrence of identification of a match between the dialed-in address of a called port and an off-hook condition for that port is identified in master sequence control unit 95, through its connections to the system control bus 83; as a consequence, the master sequence control unit outputs a busy tone on the tone data bus 75 for transmission to the calling port to inform the calling party that the call cannot be completed. The same situation applies if the ring relay for the called port has been actuated, even though that port has not yet gone off hook, the previously placed call to the called port taking precedence.

Specific Circuits for Exchange 40

Figure 2:
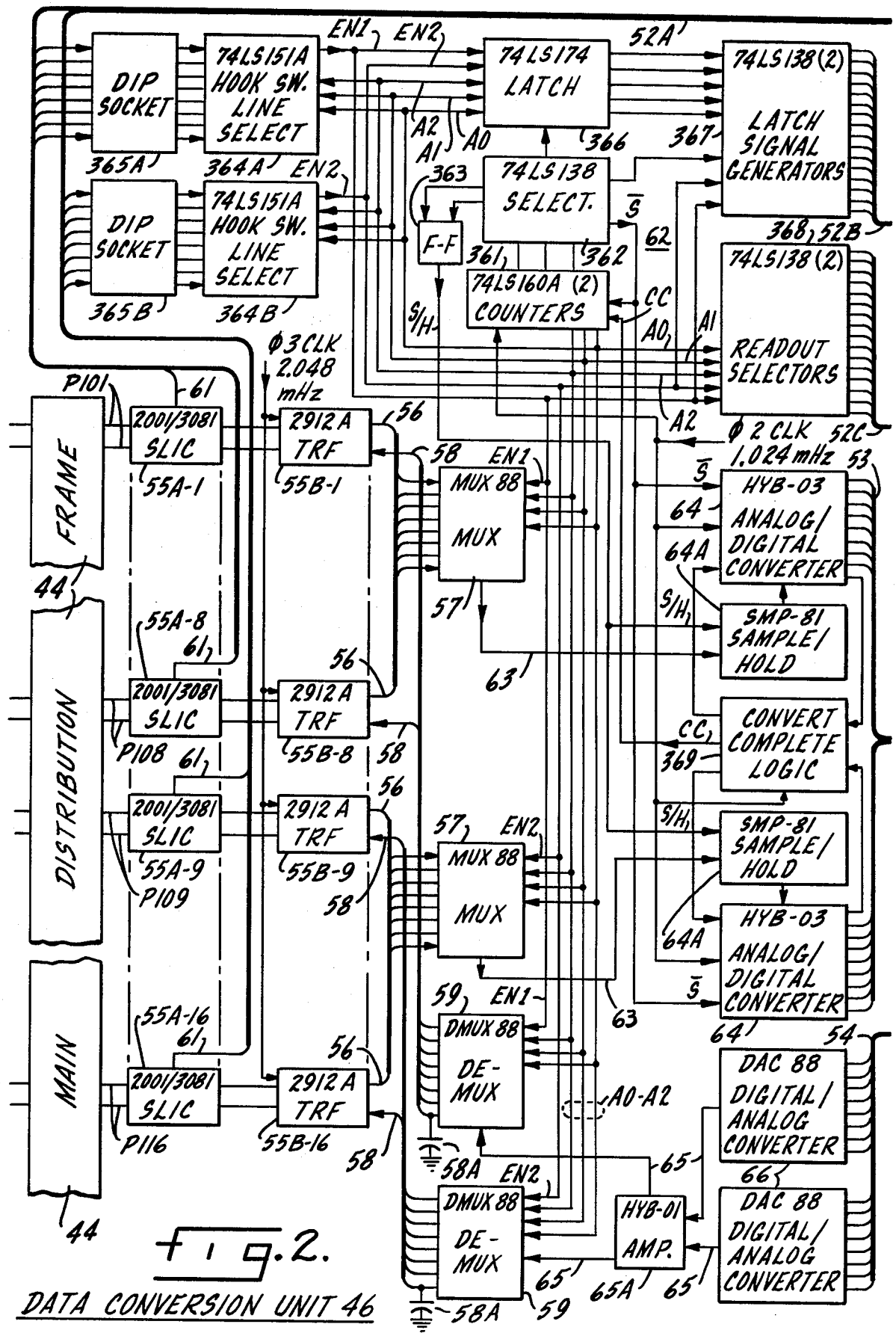
FIGS. 2, 3 and 4 are circuit diagrams, in somewhat simplified form, illustrating the data conversion and path control circuits for the input/output system of the exchange shown in FIG. 1.

Data Conversion Unit 46, FIG. 2

FIG. 2 provides a more detailed illustration of a typical construction and arrangement that may be employed for one of the data conversion units 46 incorporated in each of the data distribution modules 45 (FIG. 1). Referring to FIG. 2, it is seen that each of the SLIC/TRF circuits 55 of FIG. 1 is actually two separate chips; one of these is a subscriber line interface circuit 55A and the other is a transmit/receive filter circuit 55B. Each SLIC 55A may comprise a type 2001/3081 integrated circuit as manufactured by International Telephone & Telegraph; this is a monolithic device that effectively replaces a two-wire to four-wire hybrid converter, coupling transformer and other such circuits from earlier types of systems. Each TRF 55B, on the other hand, is a combinational filter transmitting signals in both directions relative to the port to which it is connected. In the transmit direction, from left to right as seen in FIG. 2, TRF 55B exhibits a band pass characteristic from about two hundred Hz to about 3500 Hz. In the receive direction, from right to left in FIG. 2, TRF 55B has a low pass characteristic with a cutoff at about 3500 Hz and rolls off at the low end, between approximately seventy and ninety Hz. The receive portion of TRF 55B is a sine x/x filter, utilized to eliminate aliasing problems encountered with out-of-band signals and noise beating against other out-of-band signals that may produce, as hetrodyne products, audible noises that would constitute disruptions in the output of the filter as supplied to its communication port. The TRF 55B is commercially available as a Type 2912 chip from Intel or a TP3080 circuit from National Semiconductor.

Each multiplexer 57 shown in FIG. 2 is an eight path multiplexer. Essentially, the multiplexer 57 is a time division switch capable of looking at each of the output lines 56 from eight of the TRF 55B circuits for a finite period. Taking the upper limit of the audio capability of exchange 40, as used for telephone service, as 4000 Hz, the "hamming" frequency for the multiplexers 57 should be at least eight Khz. Thus, each multiplexer 57 must scan each of its inputs 56 within a maximum time frame of 125 microseconds.

In the circuit arrangement shown in FIG. 2, a sample and hold circuit 64A is interposed in the line 63 connecting the output of each multiplexer 57 to an associated analog/digital converter 64. The sample and hold circuit 64A is gated on for approximately two microseconds of the 15.6 microsecond scan time allotted to each port for the output from multiplexer 57. The sample and hold circuit 64A provides output signals to the associated A/D converter 64 that are effectively short samples of portions of the incoming analog signal, held at a fixed level to enable the converter to convert that particular level to an eight bit pulse code modulated digital data word. Thus, the outputs from converters 64, on bus 53, are M-bit parallel digital data words, where M=8. Bus 53 is actually two eight-conductor buses.

Each A/D converter 64 (FIG. 2) is preferably a hybrid circuit including a DAC 88 A/D converter, a successive approximation register, and a number of precision trimming capacitors and resistors utilized to assure adequate stability in operation of the converter. The digital to analog converters 66, on the other hand, are conventional commercial units; the DAC 88 chip may be employed. An amplifier 65A is interposed in the output connections 65 from converters 66 to de-multiplexers 59. Again, a hybrid construction may be employed, incorporating two operational amplifiers of high input impedance together with precision trimming resistors and capacitors, all to assure adequate stability for the signal supplied to the de-multiplexer circuits 59. Each output line 58 from the de-multiplexers 59 is provided with a suitable sample and hold capacitor 58A.

The upper portion of FIG. 2 illustrates, in somewhat simplified form, an appropriate configuration for the conversion control circuit 62. As shown in FIG. 2, the conversion control circuit 62 may comprise a counter circuit 361, actually two separate counters, having a 1.024 MHz clock input ($\phi$2 CLK) from master clock 93 (FIG. 5). The counter circuit 361 is interconnected with a one-of-eight selector circuit 362 in turn connected to a flip-flop circuit 363. This combination of circuits generates the primary timing signals that control the multiplexers 57, the de-multiplexers 59, and the sample and hold circuits 64A, together with some additional circuits in conversion control 62 as described below.

Thus, the counter circuit 361 generates three address signals A0, A1, and A2. These signals define the addresses for the eight ports served by data conversion unit 46, as regards the multiplexing and de-multiplexing operations performed in circuits 57 and 59. Selector 362 generates an output signal $\bar{S}$ that is supplied to the counters 361 to define their cycle of operation and is also supplied to the two analog/digital converters 64 as a "start conversion" cycle control signal. Selector 362, in conjunction with flip-flop circuit 363, generates the short-duration sample and hold signal S/H required for control of the sample and hold circuits 64A.

The conversion control circuit 62, as illustrated in FIG. 2, further comprise two hook switch line selector circuits 364A and 364B. Each of these selector circuits has eight inputs, with each input connected to one of the hook switch outputs 61 of a SLIC 55A for one of the ports served by the illustrated data conversion unit 46. A sixteen pin dip socket unit 365A is shown interposed in the input circuits to selectors 364A and a similar dip socket unit 365B is shown interposed in the input circuits for the other hook switch line selector 364B. The purpose of these two dip socket units 365A and 365B is to provide added flexibility to the PABX by making it possible to take rotary dial signals off at this point for processing so that they do not trip the signal buses of the exchange. For a touch-tone system, as assumed in conjunction with the foregoing description for operation of exchange 40, the dip sockets 365A and 365B are simply jumpered.

Each of the hook switch line selectors 364A and 364B receives the A0–A2 inputs from counter circuit 361, identifying eight different port addresses. Hook switch selector 364A has an output EN1 that changes its voltage level when the address input to the selector matches the identification of a specific port that has gone to an off-hook condition, which information is supplied to the selector over the inputs 61. The same arrangement is used for hook switch selector 364B, for which the output is designated as EN2. The EN1 output from selector 364A is connected to the multiplexer 57 and the de-multiplexer 59 associated with the first eight ports served by data conversion unit 46, whereas the enabling signal EN2 is supplied to the other multiplexer and its associated de-multiplexer.

The three port address signals A0–A2 and the two off-hook enable signals EN1 and EN2 are all supplied as inputs to a six-bit latch circuit 366 (only five bits are utilized). A latch control signal input to circuit 366 is supplied from selector 362. The five outputs of circuit 366 are connected as inputs to a latch signal generator circuit 367, which is actually constructed as two eight-bit selectors. Selector 367 also has an actuating input derived from the one-of-eight selector 362. There are sixteen outputs from the latch signal generator 367, which form a bus 52B that is a part of the bus 52 (see FIG. 1). Actually, there is an inverter in each of the output lines forming bus 52B but these have been omitted in FIG. 2 for lack of space.

Immediately below circuit 367, in FIG. 2, there is a similar selector circuit 368, again composed of two one-of-eight selector chips. The inputs to the readout selector 368 are the address signal outputs A0–A2 from counter circuit 361 and the two enabling signals EN1 and EN2. The output from the dual readout selector 368 comprises sixteen conductors forming a bus 52C. In this instance, there are no inverters in the individual conductors of bus 52C, so that the output polarities of the buses 52B and 52C are reversed. The signals on the buses 52B and 52C are utilized to control the recording of output data from converters 64 and the readout of data into the converters 66 as described hereinafter in connection with FIG. 3.

In data conversion unit 46, as shown in FIG. 2, there is a conversion completion logic circuit 369, shown intermediate the two sample and hold circuits 64A. The conversion complete logic circuitry has outputs to each of the A/D converters 64 and an additional conversion complete output CC that is connected to the control counter unit 361. Inputs to the conversion completion logic circuit 369 include the 1.024 MHz clock, $\phi$2 CLK, which is also connected to both of the converters, and a further input connection from each of the two converters 64.

The sequence of operations in conversion control circuit 62, FIG. 2, is such that when a conversion complete signal CC occurs a port address defined by the three signals A0–A2 and the one of the enable signals EN1,EN2 is latched into circuit 366 for utilization by latch signal generator 367. The outputs from the latch signal generator 367 control the recording of output data from converters 64 in the input store 72 of FIG. 3. Conversely, the outputs from selectors 368 control the readout of data from the output store 73, also shown in FIG. 3, on bus 54 into the D/A converters 66.

FIG. 2 also shows a bus 52A which combines all of the hook switch lines 61 from the SLIC circuits 55A of the data conversion unit 46. Bus 52A goes directly to that portion of path control circuit unit 76 shown in FIG. 3.

Master Path Control Unit 47, FIGS. 3 and 4

A typical circuit for the master path control units 47 incorporated in each data distribution module 45 (FIG. 1) is illustrated in FIGS. 3 and 4. As shown in FIG. 3, the input data store 72 may constitute sixteen eight-bit data latches; each of these eight-bit data latches has eight inputs derived from bus 53 and each has an individual latch signal input from bus 52B. The output data store 73 is of corresponding construction. The outputs of the sixteen eight-bit data latches of store 73 are connected to bus 54 and the readout of signals from storage in store 73 is controlled by signals supplied to each eight-bit latch by one of the conductors of bus 52C.

The input data store 72 has eight output lines connected to data bus 74 through a bus driver circuit 371. Data bus 74 is connected to the eight inputs of output data store 73 through a bus selector circuit 372. Another eight-bit input to selector circuit 372 is provided from tone data bus 75. Bus driver circuit 371 has an enable input T and bus selector circuit 372 has a gating input $\overline{V}$ those inputs being derived as described below.

The portion of path control circuit 76 shown in FIG. 3 further comprises a receive address store 374; this receive address store may be constructed as two sixten-by-four Schottke data latches and thus has the capacity of storing one eight-bit digital address for each of the sixteen ports served by the path control circuit 76. Receive address store 374 has eight data inputs from memory data bus 84 and also has eight address identification inputs from transmit address bus 81. There are eight outputs from the receive address store 374, individually connected to the eight conductors in receive address bus 82 and also connected as inputs to a selector circuit 375. Selector circuit 375 has an additional eight inputs derived from the transmit address bus 81 and an enabling or selection input V derived as described below.

The upper right-hand corner of FIG. 3 shows a transmit select comparator 376 and a receive select comparator 377, both connected to a set of four module identification switches 378. Switches 378 are set differently to identify each individual data distribution module 45 (see FIG. 1). The transmit select comparator 376 has four inputs derived from the upper or "most significant" lines of transmit address bus 81. The output of transmit selector comparator 376 is connected to a NAND gate 379 that has a second input, designated as Q CLK, derived from FIG. 5. The output signal of gate 379 is the signal T, referred to sometimes herein as a transmit enable or transmit select signal, that indicates a match between a signal on the four most significant lines of transmit address bus 81 and the settings of the module identification switches 378. As previously noted, the transmit enable signal T is supplied to bus driver circuit 371 and to receive address store 374; it is also utilized in other circuits in FIGS. 3 and 4.

The receive select comparator 377 has four inputs from selector 375, those four inputs being representative of the four "most significant" digits in a receive address as derived by selector 375, usually from receive address store 374 or receive address bus 82, but on occasion from transmit address bus 81. The output from comparator 377, through an inverter 379, is a receive select or receive enable signal Q. Signal Q represents a match between the setting of the module identification switches 378 and the four most significant digits of a receive address as supplied from selector 375.

In the upper right-hand corner of FIG. 3 there is shown a transmit off-hook decoder 381 and a receive off-hook decoder 382. Each of the circuits 381 and 382 is a one-of-sixteen selector. Each of these circuits has sixteen inputs from bus 52A which, as previously described, provides hook switch signals representative of the hook switch conditions of the individual ports served by the data distribution module in which the path control circuit 76 is incorporated. Transmit off-hook decoder 381 has four additional inputs constituting the four conductors of transmit address bus 81 carrying the "least significant" digits of the transmit addresses. Receive off-hook decoder 382, on the other hand, has four inputs from selector 375, those inputs constituting the four least significant digits of a receive address. The output S of decoder 381 provides an indication as to whether a port momentarily identified by a signal on transmit address bus 81 is off-hook or on-hook. The output from decoder 382 provides similar information as to the hook switch condition of a port identified by a receive address.

The transmit hook switch signal S from decoder 381 is used as an enabling input to a transmit time slot decoder 384. The decoder 384 also has another control input, transmit enable signal T. There are four additional inputs to decoder 384, constituting the four least significant digits of transmit address bus 81. Decoder 384 has sixteen outputs that are connected by a bus 385 as read signal inputs to the data latches constituting input data store 72. The outputs from transmit time slot decoder 384 are also connected to a one-of-sixteen selector circuit 386 that has four additional inputs from the four least significant bits of transmit address bus 81. The output of selector 386, through an inverter 387, is supplied to an OR gate 388 that develops the tone gate signal $\overline{V}$ used to actuate bus selector 372. OR gate 388 has another input, a tone enable signal derived from FIG. 5. The output of OR gate 388 is also supplied to an inverter 389 that develops the gating signal V for receive address selector 375. This signal V is also supplied to an OR gate 391 having an output R constituting a receive hook switch signal that is used in the portion of path control circuit 76 shown in FIG. 4.

In the upper left-hand portion of FIG. 3, there is a receive time slot decoder 393 that has four data inputs constituting the least significant bits of each receive address as output from selector 375. There are two control inputs to decoder 393, one being receive enable signal Q and the other being the output signal from selector 382 that is indicative of the hook switch conditions for the ports served by this path control circuit. Decoder 393, like decoder 384, has sixteen outputs and these are connected by a bus 394 to the data latches constituting output data store 73. The signals on bus 394 are latch or record actuation signals for the data latches of store 73.

In each time slot of transfer system 42 (FIG. 1) a new transmit address appears, as an M-bit parallel digital data word, on transmit address bus 81. In the preferred system this is an eight-bit address, in which the four most significant bits identify individual data distribution modules 45 and the four least significant bits identify the sixteen individual ports connected to that module. Thus, for each new transmit address appearing on bus 81, comparator 376 determines whether the address identifies a port connected to the module in which this particular path control circuit 76 is incorporated, by comparing the four most significant bits of the address with the settings of the module identification switches 378. This signal, when coincident with the Q CLK input to gate 379, becomes the transmit enable signal T that is applied to decoder 384, to bus driver 371, and to receive address store 374, and is also supplied to FIG. 4. The same basic function is performed by receive select comparator 377 except that in this instance the comparison is between the most significant bits of a receive address and the setting of the module identification switches 378, and the output is designated as signal Q, the receive enable signal that is supplied to decoder 393 and to the circuits of FIG. 4. As noted above, the signal S developed by the off-hook decoder 381 indicates the hook switch condition for the individual port identified by each new transmit address bus 81, utilizing the four least significant digits from the bus. Decoder 382, on the other hand, performs the same function as decoder 381 in developing the receive hook switch signal R, based on the four least significant digits of a receive address as supplied from selector 375.

Selector 375 ordinarily produces an output derived from receive address store 374 or from receive address bus 82. That is, the output of selector 375 is a receive address taken from store 374 if that store has a receive address recorded in the location in the store dedicated to a particular transmit address currently appearing on bus 81. That condition applies whenever a call is being completed between two ports that are both served by the same path control circuit 76. On the other hand, if a call involves a port connected to another path control circuit, the receive address output from selector 375 is derived from bus 82. There is a third possible source for the output from selector 375, constituting an address from transmit address bus 81. This output from selector 375 occurs only when a call is not yet complete and a dial tone or a busy tone is to be supplied to a calling party on one of the ports connected to the illustrated path control circuit 76.

The output signals from decoder 384 constitute read-out signals for input store 72. Decoder 384 must have a transmit enable signal T as an input, identifying a transmit address as pertaining to one of the ports connected to the path control circuit 76, and an off-hook signal S from decoder 381, as well as the individual port identification signals derived from transmit address bus 81. Decoder 393 performs the same function for receive addresses; it must have a receive enable input Q and an off-hook signal from decoder 382 in addition to four digits of receive address information in generating the latch signals supplied to output data store 73. The data entered in output data store 73 is controlled by bus selector circuit 372; the output data store can take its information from data bus 74, driven by the bus driver 371 from this data distribution module or another of the data distribution modules, or from tone data bus 75, depending upon the tone gate signal $\overline{V}$.

FIG. 4 illustrates, in somewhat simplified form, a typical circuit for the balance of path control 76. At the bottom of FIG. 4 there is a bus driver 395 that has four inputs. These inputs, all derived from the portion of path control 76 shown in FIG. 3, comprise signals Q, R, S and T. Bus driver 395 has four outputs, designated transmit off-hook, transmit on-hook, receiver off-hook, and receiver on-hook. These are all part of system control bus 83.

In the middle of FIG. 4 there is a set ring decoder circuit 396 which has six inputs. One of these inputs is the receive select or enable signal Q from FIG. 3. Another is a set ring signal derived from that part of the master sequence control 95 illustrated in FIG. 8. The other four inputs are taken from the least significant digit lines of transmit address bus 81, through a driver circuit 397. Decoder 396 has sixteen outputs, one for each port served by the path control 76.

Immediately above decoder 396 there is a reset ring decoder 398 that also has a Q input and inputs from the four least significant digits of from transmit address bus 81. Another input to decoder 398 is taken from an AND gate 399, the inputs to gate 399 being the transmit hook switch signal S from FIG. 3 and a reset ring signal derived from the master sequence control (FIG. 5). Decoder 398 also has sixteen outputs, one for each port served by the data distribution module in which path control 76 is incorporated.

Immediately to the left of decoders 396 and 398, in FIG. 4, there is a flip-flop circuit unit 401 containing sixteen latches or flip-flops, one for each port served by path control 76. Each flip-flop in circuit 401 has an output that supplies a ring relay set signal to the communication interface adapter 48, FIGS. 1 and 14, via bus 51. The outputs from the flip-flops 401 are also supplied to an address decoder 402 that has an enabling input comprising the receive enable signal Q from FIG. 3. In addition, the four conductors of transmit address bus 81 carrying the least significant digits, pertaining to individual ports, are connected as inputs to decoder 402. The output from decoder 402 is a ring set signal that is supplied to master sequence control 95, FIG. 5, through a driver circuit 403.

Bus driver 395 serves only to provide off-hook and on-hook signals, at an adequate level, to the master sequence control 95, via bus 83. Decoder 396 is utilized to actuate flip-flops 401 to supply ring set signals to the communiation interface adapter 48 to set ring relays for the individual ports when calls are being placed to those ports, under the control of the set ring signal input from FIG. 8. Decoder 398 serves a similar purpose in resetting the flip-flops to circuit 401 in response to reset ring signal inputs derived from FIG. 5. The address decoder 402 provides a ring set output signal that enables the master sequence control to identify the fact that a particular ring relay has been set. The information from transmit address bus 81, in junction with the Q signal, simply enables the circuits of FIG. 4 to identify the particular ports requiring control, in accordance with the transmit address information on that bus.

Master Clock 93 and Master Sequence Control 95, FIGS. 5-8

FIG. 5 illustrates a typical circuit, somewhat simplified, for master clock 93 and for one portion of master sequence control 95. Master clock 93, as shown at the bottom of FIG. 5, comprises a crystal oscillator 405 operating at a frequency of 16.384 Mhz. The output of oscillator 405 is connected to a divide by eight countdown circuit 406 and to another countdown circuit 407. Countdown circuit 406 has two clock signal outputs designated as the $\phi 2$ CLK and the $\phi 3$ CLK. The $\phi 3$ CLK output from circuit 406, having a frequency of 2.048 mHz, is also coupled as an input to countdown circuit 407 through an OR gate 408. Countdown circuit 407 is coupled to a binary encoder 409 which in turn has three outputs connected to a latch 411 having an output that constitutes the Q CLK signal. The Q CLK signal is also supplied as a second input to OR gate 408. One of the outputs of encoder 409 is taken out separately under the designation $\overline{WR}$ CLK.

The $\phi 2$ CLK output from countdown circuit 406, which has a frequency 1.024 Mhz, is connected to the input of a divide by ten counter 412, in master clock 93. The output of counter 412 is connected to a flip-flop 413 circuit serving as a divide by two counter which is in turn connected to a further countdown circuit 414 having an output designated as the time out (TO) clock.

The balance of FIG. 5 constitutes a portion of master sequence control 95. One part of this circuit is a transmit address generator 416 to which the $\phi 3$ CLK signal, having a frequency of 2.048 Mhz, is connected. The transmit address signal generator 416 comprises a pair of counters producing output signals, in sequence, representative of the digital binary transmit addresses for the two hundred fifty-six transmit time slots of transfer system 42 (FIG. 1). Thus, the transmit address signal generator 416, FIG. 5, has eight outputs that are connected to transmit address bus 81 through a bus driver circuit 417 to continuously supply the required sequence of transmit addresses to bus 81 in a repetitive cycle which, in this instance, has an effective overall transfer scan cycle duration of 0.125 milliseconds, equal to the multiplex port scan cycle duration for each data distribution module 45.

As previously noted, if the pulse modulated digital automatic branch exchange of the invention is to serve more than about two hundred forty ports, the address buses 81,82, and 84 must include more than eight bits in each parallel digital data address in order to be able to identify all of the ports. FIG. 5 illustrates one simplified arrangement for adding an additional bit so that the exchange can accommodate up to about four hundred eighty ports. This modification comprises a flip-flop circuit 419 connected to an end-of-cycle output for transmit address signal generator 416 and having an output 421 that would constitute a ninth conductor for bus 81. However, this circuit 419,421, is not required for the two hundred forty port exchange shown in FIG. 1.

To monitor performance of master clock 93 against possible failure, the 32 Khz output from flip-flop 413 in the lower left-hand portion of FIG. 5 is connected as an input to a failure monitor circuit 423 located in the upper right-hand portion of the figure. Another input to the failure monitor circuit 423 is derived from an eight input NAND gate 424, those inputs being taken from the eight outputs of transmit signal generator 416. The output of monitor circuit 423 is used as an enable signal for each of the Q CLK, $\phi 2$ CLK, $\phi 3$ CLK, and $\overline{WR}$ CLK outputs of master clock 93 and is also connected to an indicator 425, in this case a light emitting diode. The output of failure monitor circuit 423 is also connected as an enabling signal to a number of NAND gates in the call initiation logic circuit 430 shown in the upper left-hand portion of FIG. 5.

The call initiation logic circuit 430 illustrated in the upper left-hand portion of FIG. 5 receives information from a number of sources, primarily on the system control bus 83, and utilizes that information in generating different actuation signals for use when a call is being initiated. The input signals to the various gates in the logic circuit 430 include the transmitter off-hook signal, the transmitter on-hook signal, the receiver on-hook signal, and the ring set signal, all of which originate in that portion of path control 76 shown in FIG. 4. In this regard, it should be remembered that this is a bussed system and that the inputs to the call initiation logic 430 of master sequence control 95 shown in FIG. 5 come from all of the path control circuits 76. Another input to call initiation logic circuit 430 is a register select signal derived from another part of master sequence control 95 shown in FIG. 8. Yet another input for this portion of the circuit shown in FIG. 5 is a ring set latch signal derived from FIG. 4. Logic circuit 430 also receives a busy enable signal from FIG. 11. Finally, there is an input to logic circuit 430 from a NAND gate 431 having a total of nine inputs, eight of which are derived from the receive address bus 82 and one from the $\overline{WR}$ CLK.

Figure 6:
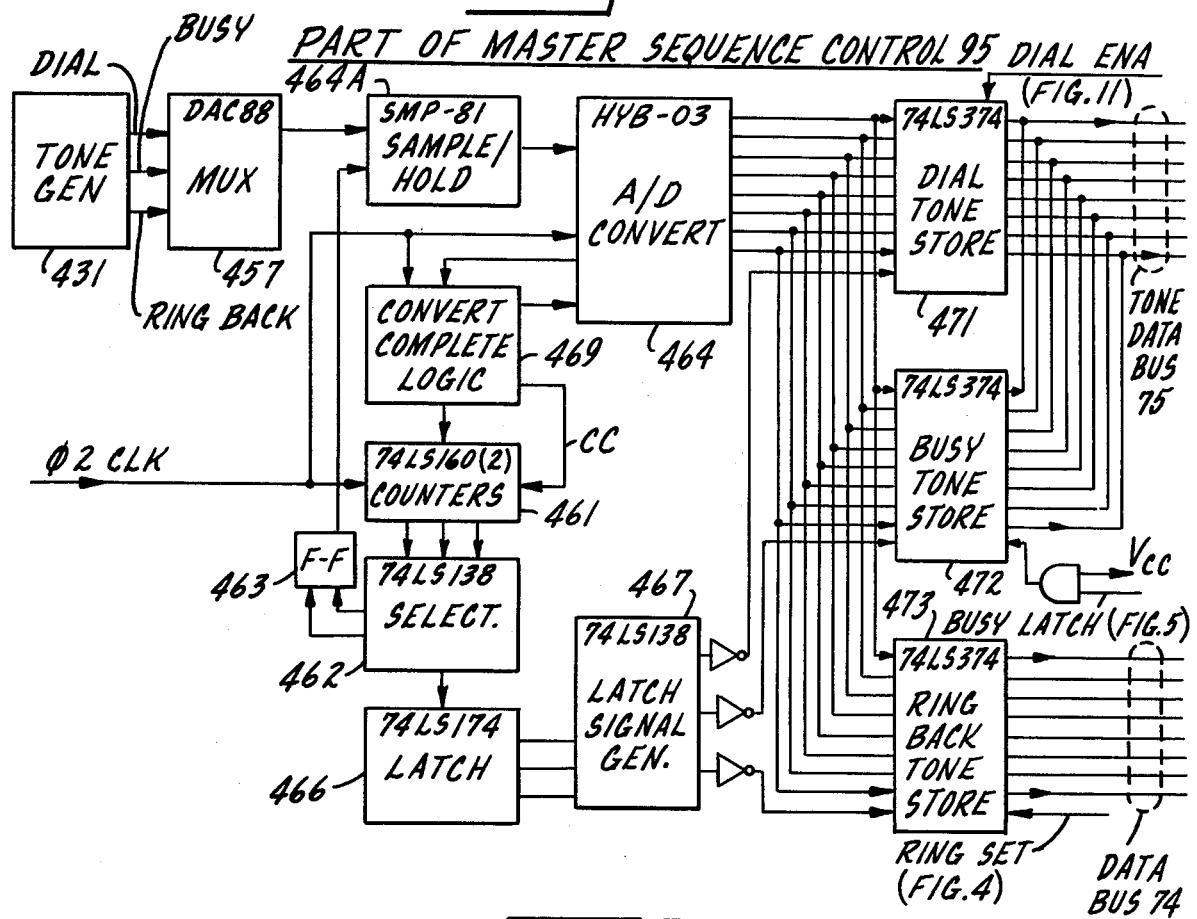
Figure 7:
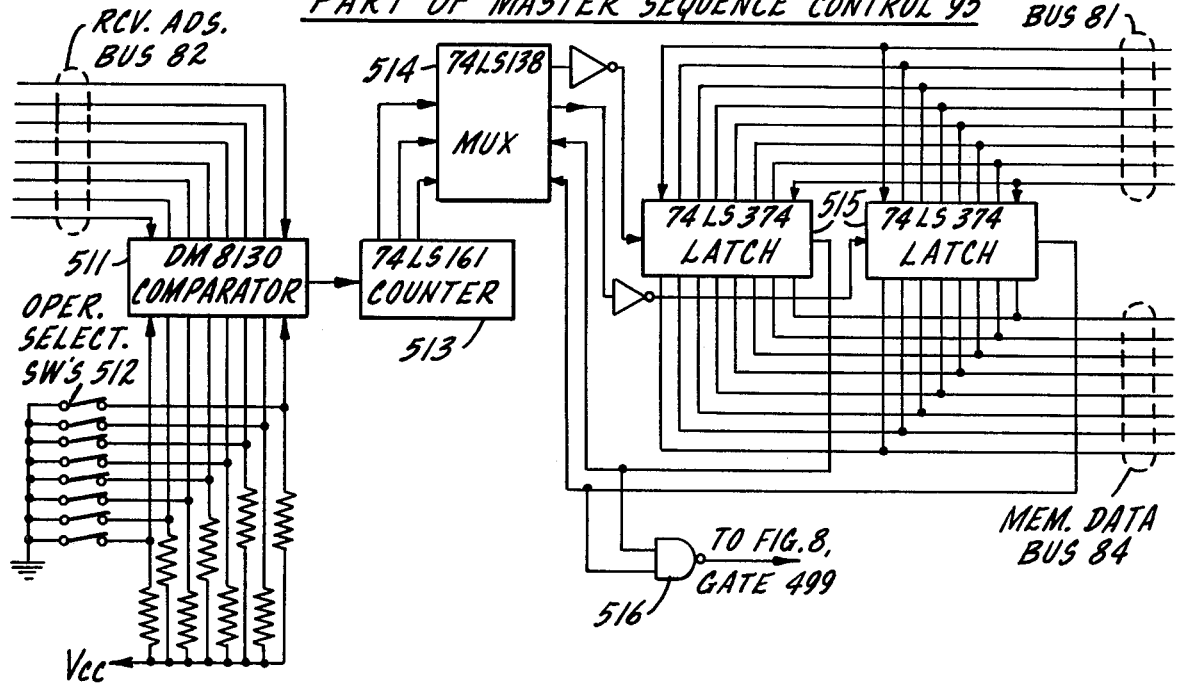

Starting from the top left-hand side of FIG. 5, the outputs from the call initiation logic circuit 430 can be seen to include a busy latch signal that is supplied to another portion of master sequence control 95 shown in FIG. 6. Another output is a tone enable signal that is supplied to each path control circuit 76 (see FIG. 3). Another output from logic circuit 430 is a reset ring signal that is supplied to each path control circuit (see FIG. 4). There is a "write" signal output from logic circuit 430, designated $\overline{WR}$, that goes to every path control circuit 76 (see FIG. 3). The last output from logic control circuit 430 is a tone register request signal that goes to tone register control 86, FIG. 11.

The various gating functions performed in call initiation logic circuit 430 will be apparent from FIG. 5, so that there is no need to describe the operations of the individual gates in developing the various signal outputs.

FIG. 6 illustrates a portion of master sequence control 95 (FIG. 1) utilized to supply dial tone, busy tone, and ringback tone signals to a port initiating a call in the exchange. This portion of master sequence control 95 comprises a conventional tone generator 431 having dial tone, busy tone, and ringback tone outputs all connected to a multiplexer 457. Multiplexer 457 also has three enabling inputs derived from a counter circuit 461. Counter circuit 461 is supplied with the $\phi 2$ CLK signal of 1.024 mHz and is interconnected with an analog to digital converter 464 in a control arrangement, comprising a one-of-eight selector 462, a flip-flop 463, a sample and hold circuit 464A, a latch 466, a latch signal generator 467, and a conversion complete logic circuit 469, that duplicates the conversion arrangement shown in FIG. 2. Since the A/D conversion circuit operation has been described in connection with FIG. 2, repetition is unnecessary.

The eight outputs from the A/D converter 464 are all connected to a dial tone data store 471, a busy tone data store 472, and a ringback tone data store 473. Latching of data in each tone data store 471-473 is controlled by an individual output from latch signal generator 467. The readout of a dial tone signal from store 471 onto tone data bus 75, as an M-bit parallel digital word, is controlled by a dial enable signal from FIG. 11. A busy tone, in digital form, is read out from store 472 onto tone data bus 75 under the control of the busy latch signal from FIG. 5. The parallel digital representation of the ringback tone is supplied to data bus 74 from store 473 in response to a ring set signal received from one of the path control circuits 76 (see FIG. 4).

The function of that portion of master sequence control 95 shown in FIG. 6 is essentially the same as that described above for supplying audio signals, in the form of M-bit parallel digital data words, on data bus 74, as described above in connection with FIG. 2 and FIG. 3, except that dial tones and busy tones are transmitted over tone data bus 75. Accordingly, it is believed that no further description of FIG. 6 is necessary.

FIG. 7 shows a typical circuit arrangement, a part of master sequence control 95, that may be used for an operator console. It includes a comparator 511 having eight inputs from receive address bus 82 and another eight inputs from a set of operator position select switches 512 set to identify the operator console address. The output of comparator 511 is used as an input to a counter 513. Counter 513 has three timing signal outputs to a selector/driver circuit 514 that is interconnected with two four-bit latches 515.

The latches 515 store transmit addresses, in sequence, from transmit address bus 81. Depending on the status of circuit 514, a transmit address from latches 515 may be output on memory data bus 84. Readout of an address onto bus 84 is signalled to the portion of master sequence control 95 shown in FIG. 8 via a NAND gate 516.

FIG. 8 illustrates a portion of master sequence control 95 constituting a non-competitive register for use by an operator's console connected to exchange 40, under control of MPU 96 (FIG. 1), utilized to avoid any necessity for employing a tone register for call placement by an operator. At the right-hand side of FIG. 8 there is an eight-bit latch 481 having eight data inputs from the bus 97 from MPU 96. Latch 481 is employed to store the digital representation of a port address being called by the operator. The eight outputs from latch 481 are connected as inputs to a comparator 482 and to a combination latch and driver circuit 483. Comparator 482 also has eight inputs derived from transmit address bus 81. The output from comparator 482 is a set ring signal carried on system control bus 83 to all of the path control circuits 76 (see FIG. 4).

A part of the control for latch 481 is provided by logic circuitry illustrated in the lower left-hand portion of FIG. 8. As shown therein, the Q CLK signal from master clock 93, FIG. 5, is input to an OR gate 484 that is in turn connected to a flip-flop circuit 485 having a control output that is connected as an input to latch 481. There is another control input derived from one of the lines of bus 97 from MPU 96, that same line from bus 97 being connected as a reset input to flip-flop 485. A second input to OR gate 484 in this control configuration is described below.

At the left-hand side of FIG. 8 is shown a combination of an eight-bit comparator 492 and latch-driver circuit 493 interconnected like comparator 482 and latch-driver circuit 483. Comparator 492 has eight inputs derived from transmit address bus 81. The other eight inputs to comparator 492, however, are derived from a set of operator position select switches 491, set in the code identifying the address assigned to the operator's console. The output of comparator 492 is utilized as an input to a NAND gate 494 in the middle of FIG. 8, to two additional NAND gates 495 and 496 in the lower left-hand portion of FIG. 8, and to an output circuit, as a register selected signal, to the portion of master sequence control 95 shown in FIG. 5. Gate 495 has two additional inputs, one being the $\overline{WR}$ clock signal from FIG. 5 and the other being the transmit off-hook signals from the path control circuits (see FIG. 4). Gate 496 also has two additional inputs, the $\overline{WR}$ clock signal and the transmit on-hook signal (see FIG. 4). The outputs of gates 495 and 496 are applied to a flip-flop circuit 497 which in turn has its output connected to an additional flip-flop or latch circuit 498 having an output connected as the second input to AND gate 494. Latch 498 has another output to the latch-driver circuit 493 and to a NAND gate 499. A second input to gate 499 is derived from the output of gate 494 and a third input to gate 499 is taken from the system control circuits shown in FIG. 7. The output of gate 499 is connected to another NAND gate 501; gate 501 has a second input constituting the $\overline{WR}$ clock signal from FIG. 5 and its output is another $\overline{WR}$ signal supplied on bus 83.

Each of the latch and driver circuits 483 and 493 has eight outputs. In each instance, those outputs are connected to memory data bus 84.

The portion of master sequence control 95 illustrated in FIG. 8 is of limited importance with respect to the overall performance of exchange 40, since this portion of the control is concerned only with operator intervention and not with the basic exchange operation. Accordingly, only a brief description is deemed necessary.

A called port address recorded in latch 481 from the operator's console, via the main processor unit 96 and bus 97, is continuously compared with the changing sequence of transmit addresses appearing on bus 81. When a match is identified, with other status conditions noted through the logic in the lower left-hand portion of FIG. 8, a set ring signal is output (on the system control bus 83) for use by the path control circuits, FIG. 4. Furthermore, for appropriate port status conditions, that address is output through latch-driver circuit 483 as a receive address on memory data bus 84. Similarly, for calls to the operator's position, transmit address data from bus 81 is continuously compared, in comparator 492, with the settings of the operator position select switches 491. For appropriate status conditions as determined by the logic in the bottom portion of FIG. 8, the operator's address is output onto memory data bus 84, via latch-driver 493, and a register selected signal is supplied to the portion of the master sequence control shown in FIG. 5.

Main Processor Unit 96

FIG. 9 illustrates the main processor unit 96 in a simple circuit arrangement appropriate for the two hundred forty port exchange 40 illustrated in FIG. 1. As shown in FIG. 9, the main processor unit 96 may comprise a conventional microprocessor with internal RAM and ROM; typically, this may be Zylog type Z8671 having a RAM capacity of two hundred fifty-six bytes and an 8K ROM. Microprocessor 520 is bus-connected to a conventional RAM, shown as a type Z6132 having a capacity of 32K bits. A loop connection back to the microprocessor is provided through an address latch and decoder circuit 522. A set of baud rate selector switches 523 are connected to the microprocessor through the looped bus and a buffer driver circuit 524 for start-up control.

In the simple configuration of FIG. 9, the only external connections for main processor unit 96, apart from the bus 97 extending to the portion of master sequence control 95 shown in FIG. 8, is the RS232C port connection between the microprocessor 520 and an operator's console, afforded by two inverters 525 and 526. Of course, additional external bus connections could be made, as indicated by the bus 527, but these are not essential to basic operation of the exchange and hence are not illustrated or described.

In main processor unit 96, as shown in the simplified configuration of FIG. 9, the purpose of RAM 521 is to store instructions for operator routines and other routines, as provided in the exchange, and to store data as presented to the RAM. Information is supplied to microprocessor 520 in serial form from the operator's console and read out of the microprocessor on bus 97 to that portion of the master sequence control 95 illustrated in FIG. 8. The microprocessor, in the illustrated configuration, is operated at a relatively high speed, approximately 8 mHz, with a cycle time of about 800 nanoseconds. Nevertheless, it is not expected to and need not function at the same speed as transfer system 42 (FIG. 1); like the data distribution modules 45, main processor unit 96 and the operator's console (not shown) are essentially asynchronous relative to transfer system 42.

Tone Registers 87, FIG. 10

FIG. 10 illustrates, in somewhat simplified form, a typical operating circuit for one of the tone registers 87. It also includes, however, a small portion of the tone register control 86, comprising a group of programmable read-only memory circuits 530, in the lower left-hand corner of the figure, all of which are connected to transmit address bus 81 and to the Q CLK source. The PROMs 530 effectively translate each of the eight bit binary addresses on bus 81 into binary coded decimal form and supply the translated addresses, in each cycle of the transfer system, to the bus 88 that is connected to all of the tone registers 87. This part of bus 88, comprising ten conductors, is connected to one set of inputs of a BCD comparator 531 in each tone register 87.

At the right-hand side of tone register 87, as illustrated in FIG. 10, there is a low pass filter input circuit 532 to which dial tone data derived from data bus 74 and reconverted to analog form by the circuit shown in FIG. 12 is supplied. The output of filter 532 is connected to a conventional touchtone decoder 533 that translates touchtone signals to binary coded decimal form. Touchtone decoder 533 has the usual four data outputs and a verification output, and these are coupled to the balance of the circuits in tone register 87 through a buffer amplifier circuit 534.

The four data outputs of the touchtone decoder are each connected as inputs to three latch or storage circuits 535, 536, and 537. Each of these latches is utilized to store one of the three numbers in a port address as supplied to tone register 87 in the form of touchtone signals through low pass filter 532. The sequence of recording the three numerals in latches 535-537 is controlled by a counter 538 and a selector circuit 539, counter 538 having an input from the verification output of touchtone decoder 533. Counter 538 has two outputs connected to selector 539 and selector 539 has three individual outputs each connected as an enabling input to one of the latches 535-537. The first digit of a sequence of three, sufficient to identify one port in the exchange, is recorded in latch 535; the second digit is recorded in latch 536 and the third digit is entered in latch 537. The outputs of these three latches are all connected to comparator 531; there are four output connections from each of the latches 536 and 537 because each of these latches may record a number from zero to nine, but only two output connections are needed from latch 535 because the first numeral of any port address is no bigger than three.

In the upper left-hand portion of FIG. 10 there are two eight-bit latches 541 and 542; latch 541 is a calling port address store and latch 542 is a called port address store. The data input to each of these latches 541 and 542 comprises the transmit address bus 81. The outputs of address stores 541 and 542 are connected to memory data bus 84. The latching of data into calling port address store 541 is controlled by a register set signal from FIG. 11. The recording or latching of data into called port address store 542 is controlled by an output signal from comparator 531, generated when a match is found between a port address recorded in latches 535-537 and a port address currently appearing on transmit address bus 81. Readout of a calling port address from store 541 is actuated by the same output signal from comparator 531 that latches data into store 542. Readout of a called port address from store 542, on the other hand, is effected by a time slot signal T/S from FIG. 11, identifying the specific transfer time slot assigned to this particular tone register 87.

Effective operation of tone register 87, FIG. 10, requires some additional input information. In part, this is supplied through a series of circuit connections shown at the center left-hand portion of the drawing, comprising the transmit off-hook signal from FIG. 4 and $\overline{\text{WR}}$ CLK signal from FIG. 5, both supplied as inputs to a NAND gate 543. Another input to NAND gate 543 is the match-identified output signal from comparator 531. A fourth input to NAND gate 543 is the ring set signal from FIG. 4. The output of NAND gate 543 is taken as one input to a flip-flop or latch circuit 544. The output from gate 543 is also supplied, as a tone register set ring signal, to the portion of tone register control 86 shown in FIG. 11. The output from gate 543 is also taken as one input to a NAND gate 545.

The output of flip-flop 544 is applied to a gate 546 incorporated in the readout control input to called port address store 542. The output of gate 546 is also connected to an OR gate 547 having a second input derived from the $\overline{\text{WR}}$ CLK input through an inverter 548. The output of OR gate 547 is connected as the second input to NAND gate 545. The output of gate 545 is a control signal designated as T.R. $\overline{\text{WR}}$ that is supplied to control 86 (FIG. 11).

The transmit on-hook signal from FIG. 4 is connected as one input to an OR gate 551 located in the upper right-hand portion of FIG. 10. A second input to gate 551 is the register time slot signal T/S from FIG. 11. The output of gate 551 constitutes one input to the NAND gate 552. Another input to gate 552 is taken from the output of gate 546. A third input to gate 552 is derived from a timeout counter 553. The output of gate 552, through an inverter 554, is supplied as a readout signal to each of the latches 535-537.

Timeout counter 553 has an input from the timeout clock of FIG. 5. Another input to counter 553 is derived from the verification output of touchtone decoder 533 through an inverter 556. Another input to counter 553 is taken from the register set signal supplied from FIG. 11. The function of counter 553 is to reset register 87 in the event that one of the ports goes off-hook as a calling party, dials in only one or two numbers of a called port address, and then fails to complete dialing in the balance of the called port address but does not hang up. Timeout counter 553, in these circumstances, effectively resets tone register 87 so that it will be available for subsequent use; this is done after a relatively lengthy time interval which may, for example, be about sixteen seconds.

The output of gate 552 is the internal reset signal for tone register 87. This register reset signal is also supplied to that portion of tone register control 86 shown in FIG. 11, as indicated in the lower right-hand corner of FIG. 10. The register reset signal is also supplied to counter 538 and is applied as a second input to flip-flop circuit 544.

When tone register 87 has been "seized" and is engaged in operations incident to initiation of a call, it cannot be utilized in connection with another call. Thus, it is desirable to supply a signal from tone register 87 to tone register control 86 to indicate when the register is already in use. This is accomplished by a tone register busy gate 558 located at the left-hand side of FIG. 10. There are three inputs to gate 558. One is derived from flip-flop circuit 544. A second is the time slot signal T/S, supplied to gate 558 through an inverter 559. The third input to gate 558 is taken from the third numeral record output of selector 539. The tone register busy output signal from gate 558 is supplied to that part of tone register control 86 illustrated in FIG. 11. It is also desirable to have tone register 87 output a control signal to interrupt the dial tone that is supplied to a calling port prior to entry of a first touchtone signal from that port in the course of placing a call. The dial tone off signal gate 561, which is located in the lower right-hand corner of FIG. 10 and which has its inputs derived from the outputs of counter 538, serves this purpose.

Tone register 87 (FIG. 10) can also be equipped to provide additional functions and outputs, such as an executive override function. Since those additional functions are not essential to the basic operation of the exchange, however, they are not shown or described.

The basic function of tone register 87, despite the apparent complexity of FIG. 10, is relatively simple. Each touchtone signal supplied to data bus 74 when a call is being placed is reconverted to analog (audio) form in the part of tone register control 86 shown in FIG. 12 and is supplied to the tone register through low pass filter 532, FIG. 10. The first numeral of the called party address is translated from touchtone form to BCD form and recorded in latch 535. At the same time, a dial tone off signal is output from gate 561. The succeeding two numbers of the called party address are recorded in latches 536 and 537, respectively.

Comparator 531 continuously compares the contents of latches 535-537 with the continuously changing transmit addresses on bus 81 as output in BCD format from PROM circuit unit 530. When a match is discovered, this is signalled on the output line 562 of comparator 531, which is connected to both the calling port address store 541 and the called port address store 542.

Identification of a match in comparator 531 occurs in the transmit system time slot specific to the called port, this being the transfer time slot when the permanently assigned transmit address of the called port appears on bus 81. Thus, the output signal from comparator 531 is used as a latch or recording control signal to effectively record the called port address from bus 81. That address is read out onto memory data bus 84 in the next time slot for the calling party so that it can be recorded as the receive address for the calling port. The output signal from comparator 531, conversely, functions as a readout signal for the calling port address recorded in store 541, which has been recorded in that store by the latch or record control signal identified as the register set signal from FIG. 11. When these operations in tone register 87 are completed, a register reset signal generated by gate 552 is used to set tone register 87 for use in initiation of another call from another port. The register reset signal is output to the tone register control, FIG. 11. Resetting of the tone register and the outputting of a register reset signal can also occur for other conditions, as when the transmitter goes on hook while placement of a call is incomplete, or when time-out counter 553 operates as described above.

Tone Register Control 86, FIGS. 11 and 12

One portion of the tone register control unit 86, comprising the PROMs 530 used for translation of transmit addresses to BCD form, appears in FIG. 10. The balance of the circuits utilized for tone register control 86, in a typical installation, appear in FIGS. 11 and 12.

As shown in FIG. 11, the tone register control includes a bus driver circuit 571, in the top central portion of the drawing, that is connected to memory data bus 84 and that has a register request input from the master sequence control (FIG. 5), supplied through a gate 572. Five data inputs to bus driver 571 are taken from a series of five address select switches 573. Switches 573 are individually set to define the five most significant digits for time slot addresses for all of the tone registers served by register control 86, typically six tone registers. The remaining three digits for the individual tone register addresses, in binary format, are supplied to bus driver 571 by three additional inputs taken from a counter 574.

Counter 574 has an input from the $\phi 2$ CLK, FIG. 5. The three outputs from counter 574 are connected to a selector circuit 575 that has six outputs individually connected to a series of six flip-flop circuits, shown as a flip-flop circuit unit 576. Six additional inputs to flip-flops 576 are derived from the register reset outputs of the individual tone registers; see FIG. 10. The outputs of the individual flip-flops in unit 576 constitute register set signals that are supplied to an audio control section of tone register control 86 illustrated in FIG. 12 and that are also connected as inputs to two latch/decoder circuits 577 and 578. Latch/decoder circuit 577 also has three inputs taken from the three outputs of counter 574. An output from latch 577 is supplied to counter 574, to selector 575, and to the second input of gate 572.

The portion of tone register control 86 shown in FIG. 11 generates a $\overline{WR}$ signal, applied to the $\overline{WR}$ line in system control bus 83, utilized to control the recording of receive addresses in the receive address stores 374 of the different path control circuits 76 (see FIG. 3). This portion of tone register control 86 is illustrated in the upper right-hand corner of FIG. 11. It includes a gate 579 having one input derived from the output of register request gate 572 and a second input comprising the $\overline{WR}$ CLK signal from FIG. 5. The output of gate 579 comprises one input to a gate 581 that has six additional inputs, one taken from each of the TR $\overline{WR}$ outputs of the individual tone registers (FIG. 10). The output from gate 581 is the $\overline{WR}$ signal that is supplied to the individual path control circuits 76 (FIG. 3) over bus 83.

In the upper left-hand corner of FIG. 11 there is a comparator 582 having five inputs connected to the five most significant digit lines of receive address bus 82. Another series of five inputs to comparator 582 is derived from the address select switches 573. The three least significant digits of bus 82 are connected as inputs to a latch circuit 583. A recording control or latch control signal to latch 583 is derived from a gate 584 that has two inputs, one the output of comparator 582 and the other the Q CLK signal from FIG. 5. There are three outputs from latch 583 that are connected as inputs to a selector circuit 585, to the latch/decoder 578, and to another latch/decoder circuit 586.

The output from comparator 582 is utilized as an actuation or control input to each of the latch/decoder circuits 578 and 586. Circuit 586 has six individual inputs, constituting the dial tone off signals from the individual tone registers 87 (see FIG. 10). The output of latch/decoder circuit 578 is a signal identifying the effective seizure or selection of a register for use in a call initiation, this register selected (seized) signal being supplied to FIG. 5 via system control bus 83. The output of latch/decoder circuit 586 constitutes one input to a dial tone latch gate 587, the other input to gate 587 comprising the output of latch/decoder 578. The output of gate 587 is a dial enable latch signal that is also supplied, over bus 83, to FIG. 6.

As previously described, each tone register 87 generates a set ring signal; see FIG. 10. In the tone register control, FIG. 11, these TR set ring signals are all supplied as inputs to a gate 589 that generates a set ring output signal supplied to FIG. 4. Further, each of the tone registers produces a TR busy signal as described above in connection with FIG. 10. In the tone register control, FIG. 11, these signals are all supplied as inputs to a busy gate 591 that produces a busy enable signal supplied to the master sequence control 95, FIG. 5.

In considering the operation of the portion of tone register control 86 illustrated in FIG. 11, it should be noted first that the flip-flops 576 at the right-hand side of the figure afford a continuing indication of the general operating condition of each of the tone registers 87; that is, each time one of the registers is reset and ready for use in a new call, that information is signalled to one of the flip-flops 576 by a register reset input from the tone register, whereas whenever any of the registers is set in operation, this is accomplished by a signal from selector 575 that sets the flip-flop to afford a continuing register set signal output.

When a register request signal is supplied to tone register control 86, it actuates bus driver 571 to read out the five most significant digits of a transmit address onto memory data bus 84, determined by the settings of address select switches 573. Assuming that latch decoder 577 is able to identify one of the six tone registers connected to the control as being in reset condition, ready for use, the three additional binary bits necessary to complete the unique tone register address are supplied to memory data bus 84, by driver 571, through the input connection to the driver from counter 574, functioning as a tone register address generator. Thus, a transfer system address is output on bus 84 to be recorded in the receive address store 374 (FIG. 3) for the calling port, affording that port access to a specific tone register. At the same time, the output of decoder 577 (FIG. 11), in conjunction with the address outputs from counter 574, actuates selector 575 to supply an input to the flip-flop 576 associated with the tone register identified by the address being output on bus 84, sending a register set signal to the audio portion of the tone register control, FIG. 12. The register set condition for the selected tone register is also recorded in the latch/decoder circuits 577 and 578 for future reference. The output of decoder 577 changes its level, preventing selection of the same tone register by a subsequent register request and allowing counter 574 to advance one count in its cycle and thus change the address that it supplies to driver 571, selector 575, and latch/decoder 577.

During each cycle of transfer system 42 (FIG. 1), as described above, any receive address recorded in a receive address store 374 (FIG. 3), at the location corresponding to a transmit address appearing on bus 81, is output from the receive address store onto receive address bus 82. When the receive address on bus 82 incorporates the five most significant digits that match the setting of address select switches 573, FIG. 11, comparator 582 produces an output signal that actuates latch 583 to record the three least significant digits from that same address. This constitutes the identification of the individual tone register, which is supplied to selector 585 and outputs a data latch signal to the audio portion of tone register control 86, FIG. 12. This allows the transmission of audio information from data bus 74 to the tone register 87 that has been selected, as described above.

Thus, one of the primary control functions of the portion of tone register control 86, FIG. 11, is to identify an available tone register for initiation of a call and to supply the address of that tone register, via memory data bus 84, as a receive address for the calling port for transmission of a dial tone. Another important function is to supply a write signal $\overline{WR}$ to enable the recording of the tone register address as a receive address for the calling port. A further function is to effectively establish the tone register in a busy condition so that it cannot react to a subsequent register request; any such additional request occurring while the tone register is in use is passed on to the next available tone register. Other functions are to generate set ring, register selected, dial enable, dial latch, and busy enable signals for use in control of the exchange.

FIG. 12 illustrates the audio or tone data portion of tone register control 86. It includes an audio data store 601 having the same basic construction as the data stores 72 and 73 (FIG. 3), though smaller, including an eight bit latch for each of the tone registers 87 controlled by tone register control 86. The data input to store 601 is derived from data bus 74. Recording of data in store 601 is controlled by dial latch signals from that part of control 86 illustrated in FIG. 11. Since there are six tone registers assigned to control 86, there are six readout inputs to store 601, derived from a readout selector 602.

Audio data store 601 has eight data outputs connected to a digital-to-analog converter 603. The output of converter 603 is supplied to a demultiplexer 604 through an amplifier circuit 605.

A register selection circuit 606 in the lower left-hand corner of FIG. 12 has six inputs constituting the register set signals from FIG. 11. Selector 606 also has three address inputs from a tone register address generator comprising two counters 607 and 608 to which the timing input comprises the $\phi 2$ CLK signal (FIG. 5). The series of address signals generated by counter 608 is supplied to demultiplexer 604 and to readout selector 602 as well as to the register set selector 606. Selector 606 also has a control output that is supplied as an input to readout selector 602 and demultiplexer 604.

As will be readily apparent, the audio portion of tone register control 86 illustrated in FIG. 12 is essentially the same as the audio output portion of each of the data distribution modules as shown in FIGS. 2 and 3. Thus, audio data appearing on bus 74, in the form of M-bit pulse code modulated parallel digital data words, is stored in the audio data store 601 for tone register control 86. It is read out of the store, for those registers set for use in placing calls, under the control of selector 602 as actuated by selector 606, recording of the audio data having been controlled by the data latch signals from FIG. 11. The analog audio output from converter 603 is supplied to the individual tone registers (FIG. 10) by demultiplexer 604.

Communication Interface Adapter 48, FIG. 13

FIG. 13 illustrates a portion of a typical operating circuit for communication interface adapter 48. The circuitry shown in FIG. 13 constitutes one-eighth of each communication interface adapter 48, since each such adapter is constructed to serve sixteen telephone ports connected to one of the data distribution modules 45 (FIG. 1) and the adapter circuitry for only two ports is shown. Adapters 48 are not connected to external trunk ports, such as port P330 for trunk T330 (FIG. 1).

As illustrated in FIG. 13, the line connections (ring and tip) for port P101, as connected to SLIC 55-1, include a pair of ring relay contacts 611 actuated by a ring relay coil 612. Similarly, a pair of ring relay contacts 621, actuated by a ring relay coil 622, are incorporated in the line connections from port P102 to its SLIC 55A-2. Both of the relays are shown in the unactuated or reset condition, so that the ports P101 and P102 are connected to the two SLICs. However, if coil 612 is energized to set the ring relay for port P101, contacts 611 disconnect the conductors of port P101 from SLIC 55A-1 and connect the port conductors to the output of a ring signal generator 613. Similarly, if the relay 621,622 is actuated or set, port P102 is disconnected from SLIC 55A-2 and is connected to the ring signal generator output. The ring signal generator 613 serves all of the communication interface adapter units 48 of the exchange.

Energization of the ring relay coils 612 and 622 is effected by a dual flip-flop circuit 614 having one flip-flop connected to each of the coils. The ring set signals for the two ports are supplied to the flip-flops in circuit 614 from the path control circuit 76 associated with ports P101 and P102 (FIG. 4). Reset signals to the individual flip-flops controlling the relay coils are supplied from an off-hook detector 615 having two inputs, one derived from a voltage divider connected to the circuit that links port P101 to ring signal generator 613 and the other from a voltage divider connected to the circuit linking port P102 to the ring signal generator.

Operation of interface adapter 48, as shown in FIG. 13, is simple and straightforward. Thus, a ring set signal for port P101, supplied to one flip-flop in circuit 614, sets the flip-flop and energizes ring relay coil 612 to actuate contacts 611 so that ring signal generator 613 is connected to the port. This occurs in the course of placement of a call to port P101, at a time when the port is on-hook and the impedance across the ring and tip conductors of port P101 is effectively infinite. As a consequence, the ring signal output from generator 613 is supplied to port P101 and the telephone or like instrument connected to that port produces a ring or other perceptible signal to indicate that a call is being placed to the port.

When the port being called, in this instance port P101, goes off-hook, the impedance across the port conductors changes drastically, to approximately six hundred ohms. When this happens, the change is detected by the input connection to off-hook detector 615, which generates an output signal that is supplied to the flip-flop in circuit 614 associated with coil 612, resetting the flip-flop. In consequence, coil 612 is de-energized and contacts 611 return to their original position, again connecting the conductors of port P101 to SLIC 55A-1. The operation is the same as regards port P102.

Signal Timing, FIG. 14

FIG. 14 affords an illustration of the timing relationship of certain signals in a pulse modulated digital branch exchange utilizing the types of circuits described above in connection with FIGS. 2–13, relative to the recurring transmit time slots assigned to the individual ports P101 through P340, assuming that the time slots for the operator's console and the tone registers are at some intermediate portion in the transfer system cycle. In the upper portion of FIG. 14, a substantial number of the control signals are shown as they occur during time slots for port P101 and port P339 during the initiation of a call, port P101 being the calling port and port P339 the called port. These signals indicate actions that occur prior to the time that the port P339 goes off-hook to complete the call. It will be recognized that a number of other control signals occur during these same recurring time slots; however, those presented afford a clarification of the timing relationship for the principal control activities. Furthermore, it should be recognized that the signals shown as occuring in the time slots for port P101 and those indicated as appearing in the time slots for port P339 would be reversed if port P339 were initiating placement of a call to port P101.

FIG. 14 further illustrates the timing for principal control signals, in terms of the recurring transfer time slots, that occur when port P339 answers the call from port P101, going off-hook so that a talk path is established between the two ports. Further down in FIG. 14, a sequence of principal control signals occurring upon termination of the call, assuming that port P339 hangs up, are illustrated. Finally, the lowermost group of relative timing signals shown in FIG. 14 illustrates a situation in which port P101 places a call to port P339 but there is no answer and port P101 hangs up. Again, if the relationship of the two ports is reversed, with port P339 the calling port and P101 the called port, the two sets of signals would be reversed as regards the time slots for the ports.

Miscellaneous—Conclusion

The specific circuit drawings described above, particularly FIGS. 2 through 13, include many different integrated circuits, of standardarized, commercially available types. In order to afford a more complete disclosure of a specific embodiment of the invention, the preferred integrated circuits or "chips" are identified, in these drawings, by type numbers incorporated within the outline of each integrated circuit in the drawing. Power supply connections and other conventional external connections for the integrated circuits have not been illustrated, in most instances, to save space in the drawings and thus allow more comprehensive and more illustrative presentation of the individual circuits. For example, with respect to microprocessor 520, FIG. 9, it will be recognized that an external crystal, timing capacitors, and a master reset switch would be required for effective operation. However, it is believed that this type of external connection for the individual integrated circuits is well within the knowledge of those working in this art.

In FIGS. 1 and 3, the input data store 72 and the output data store 73 are shown as separate units. Furthermore, in connection with FIG. 3 each of these data stores is described as comprising four integrated circuits (type 74LS364) each constituting four eight-bit data latches to afford the requisite sixteen eight-bit storage locations for data storage, one storage location specific to each port served by the data distribution module in which the two stores are incorporated. However, as will be readily apparent, it is not essential to provide physically separate input and output data stores. Thus, the data storage means comprising input store 72 and output store 73 may constitute one data store having sixteen eight-bit storage locations; in an arrangement of this kind, the digitized audio data is still transferred, by means of the data bus, from an initial input location to an output location with the same timing as described for separate stores 72 and 73. Another way to accomplish the same result in a unified store for both input and output purposes is to utilize a two hundred fifty-six bit memory with two eight-bit storage locations assigned to each port, one as an input storage location and the other as an output storage position, again with the same transfer timing between locations. Indeed, all of the storage capacity for performing the functions of input store 72 and output store 73 could be combined into a single unified memory, though this would be less desirable because it would be contrary to the modular arrangement used for data distribution module 45.

The pulse code modulated digital automated branch exchange of the present invention is not limited to use in telephone service. It is readily adaptable to a number of different applications in which the data transferred through the exchange is already in a digital format. For example, the exchange may be readily adapted to use in a teleprinter network, in which case the conversion from analog to digital form is not necessary, though it is necessary to convert the incoming serial digital data to parallel form for processing in transfer system 42. Another adaptation that can be achieved by modification of the data distribution modules 45 pertains to the transmission of data between bisynchronous data ports, either half-duplex ports or full-duplex ports. Yet another modification that is readily possible is to connect the exchange to one or more optical data ports, which again may be half-duplex or full-duplex paths. Of course, the requirement for translation from analog to digital form is again eliminated in each of these modifications, but other conversions may be required in the input modules, such as conversion from one digital code to another, both for transmission of data through transfer system 42 and for inter-communication between data ports serving external equipment that utilizes different codes. Thus, exchange 40 can be adapted to the transmission of information through networks serving word processors, computers, and other types of external equipment.

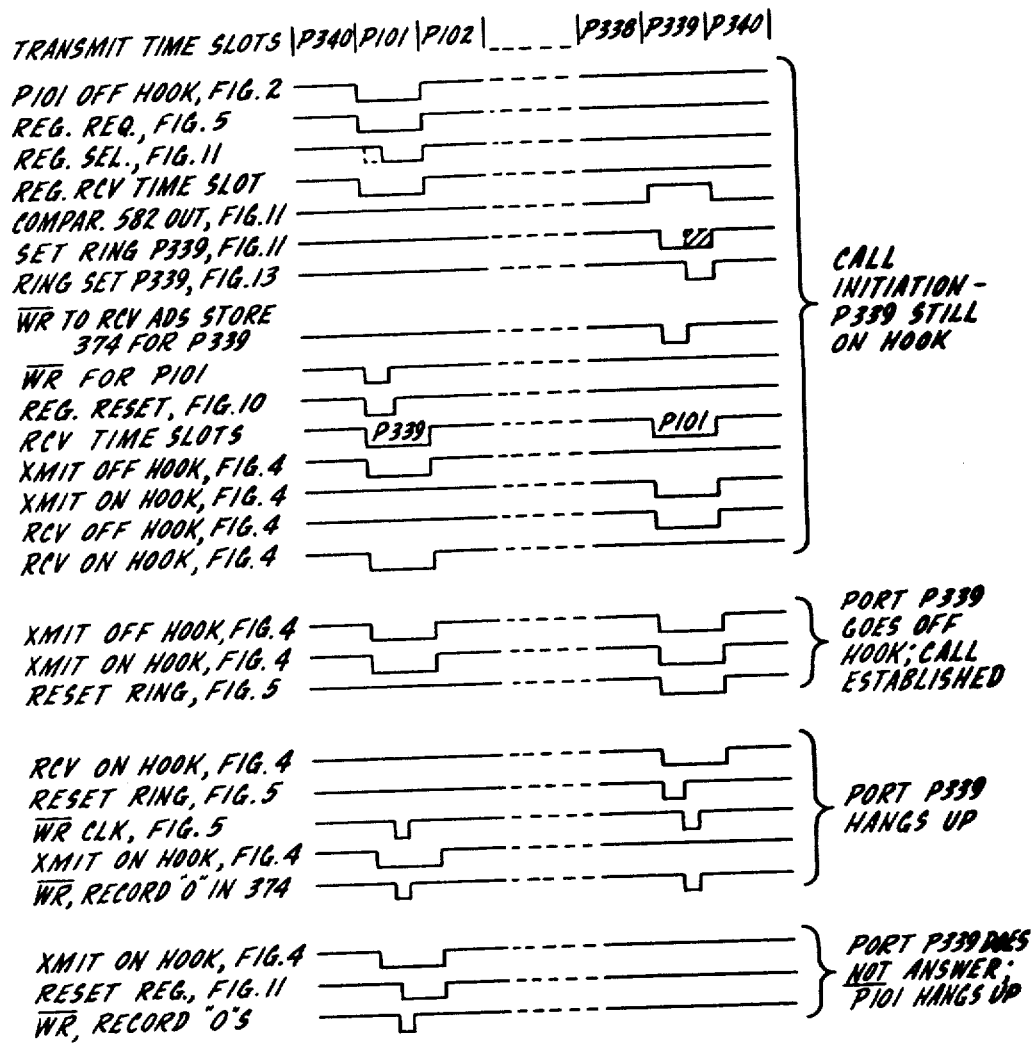

I claim:

1. A pulse code modulated digital automatic exchange for a telephone network or like communication network, comprising:
    an input/output system including:
        line connection means defining N communication ports;
        a series of input multiplex conversion means each connected to a plurality of the communication ports and each generating a multiplexed sequence of M-bit parallel digital data signals, each digital data signal being representative of an input signal received at one communication port;
        a corresponding series of output de-multiplex conversion means, each connected to the plurality of communication ports served by one input conversion means, for converting M-bit parallel digital data signals to output signals and selectively applying those output signals to those communication ports;
    conversion control means, connected to the input conversion means and the output conversion means, for actuating each input conversion means and its associated output conversion means at a multiplex conversion rate determined by the nature of the input and output signals, in accordance with a multiplex scan cycle of given duration;
    data storage means, connected to the input conversion means and the output conversion means, including at least N M-bit storage locations, at least one storage location associated with each communication port; and
    path control means, connected to the conversion control means and the data storage means, for correlating any and all possible combinations of two communication ports for data transfer calls and actuating the data storage means to effect a first series of transfers of parallel M-bit digital data signals from a storage location for one port in a call to a storage location for the other port in that call and a second series of transfers of parallel digital data signals from a storage location for the other port to a storage location for the one port in that call;
    and a data transfer system including:
        an M-bit parallel digital data bus, connected to the data storage means, for transferring digital data signals recorded at one location in the data storage means to another location in the data storage means;
        and sequence control means, connected to the path control means, for actuating the path control means in accordance with a transfer cycle of sequential transfer time slots, one time slot assigned to each communication port, with one of the series of data transfers occurring in the time slots assigned to the calling port in a call and the other series of data transfers occurring in the time slots assigned to the called port in that call; the duration of the complete transfer cycle, encompassing all N ports, being no greater than the duration of the multiplex scan cycle.

2. A pulse code modulated digital automatic exchange according to claim 1 in which the period for each transfer time slot is substantially less than one microsecond.

3. A pulse code modulated digital automatic exchange according to claim 2 in which the duration of the multiplex scan cycle is equal to the duration of the complete transfer cycle.

4. A pulse code modulated digital automatic exchange according to claim 3 in which:
    each input conversion means includes a multiplexer connecting a plurality of communication ports to an analog to digital converter;
    and each output conversion means includes a digital to analog converter connected to a de-multiplexer in turn connected to the same ports as the multiplexer.

5. A pulse code modulated digital automatic exchange according to claim 1, or claim 2, or claim 3, or claim 4, in which the data storage means comprises a plurality of data stores, each connected to a limited number of input conversion means and associated output conversion means, all of the data stores being interconnected by the digital data bus.

6. A pulse code modulated digital automatic exchange according to claim 5 in which each data store comprises an input data storage unit and an output data storage unit, each having an M-bit storage location for each port served by the associated input and output conversion means, and in which each data transfer shifts data from an input storage unit to an output storage unit.

7. A pulse code modulated digital automatic exchange according to claim 1, or claim 2, or claim 3, or claim 4, in which the conversion control means comprises a plurality of conversion control circuits, each connected to and actuating a limited number of input and output conversion means.

8. A pulse code modulated digital automatic exchange according to claim 7, in which each conversion control circuit is connected to and actuates two input conversion means and two output conversion means, and in which each input conversion means and each output conversion means is connected to eight communication ports.

9. A pulse code modulated digital automatic exchange according to claim 7 in which:
the path control means comprises a plurality of path control circuits, each connected to one conversion control circuit and to the data storage means;
and the data transfer system includes a plurality of parallel digital address buses, interconnecting all of the path control circuits and the sequence control means, for transferring time slot address data, identifying the ports involved in individual calls, among the path control circuits.

10. A pulse code modulated digital automatic exchange according to claim 9 in which the data storage means comprises a plurality of data stores, at least one for each path control circuit, all of the data stores being interconnected by the data bus.

11. A pulse code modulated digital automatic exchange according to claim 10 in which each data store is of dual construction, comprising an input data store having M inputs connected to the input conversion circuits served by one conversion control circuit, and an output data store having M outputs connected to the output conversion circuits served by the same conversion control circuit, with each input data store adapted to output parallel digital data signals onto the data bus and each output data store adapted to record parallel digital data signals from the data bus.

12. A pulse code modulated digital automatic exchange according to claim 11 in which each conversion control circuit is connected to and actuates two input conversion means and two output conversion means, and in which each input conversion means and each output conversion means is connected to eight communication ports.

13. A pulse code modulated digital automatic exchange according to claim 1, or claim 2, or claim 3, or claim 4, in which:

the data transfer system includes a multi-bit parallel digital transmit address bus connected to the sequence control means and to the path control means;
and the sequence control means includes a transmit address generator, connected to the transmit address bus, for generating a sequence of digital parallel multi-bit transmit addresses, each identifying one specific communication port, and for applying those transmit addresses to the transmit address bus in a continuous cyclically repeating sequence, one address in each time slot, to identify the port to which each time slot is assigned.

14. A pulse code modulated digital automatic exchange according to claim 13 in which:
the path control means comprises receive address storage means for recording transmit addresses as receive addresses in N individual storage locations, one for each communication port;
and the path control means further comprises transmit/receive address comparator means for comparing transmit addresses from the transmit address bus with receive addresses recorded in the receive address storage means to correlate any two ports for a data transfer call.

15. A pulse code modulated digital automatic exchange according to claim 14 in which:
the receive address storage means comprises a plurality of receive address stores, each serving a limited number of ports and having a storage location for each port it serves;
the data transfer system includes a multi-bit receive address bus interconnecting all of the receive address stores and the transmit/receive address comparator means;
and the transmit/receive address comparator means compares receive addresses read out from the locations in the various receive address stores onto the receive address bus under control of the transmit addresses on the transmit address bus.

16. A pulse code modulated digital automatic exchange according to claim 15 in which the data storage means comprises a plurality of data stores, each connected to a limited number of input conversion means and associated output conversion means, all of the data stores being interconnected by the digital data bus.

17. A pulse code modulated digital automatic exchange according to claim 16 in which each data store comprises an input data storage unit and an output data storage unit, each having an M-bit storage location for each port served by the associated input and output conversion means, and in which each data transfer shifts data from an input storage unit to an output storage unit.

18. A pulse code modulated digital automatic exchange according to claim 16 in which the conversion control means comprises a plurality of conversion control circuits, each connected to and actuating a limited number of input and output conversion means.

19. A pulse code modulated digital automatic exchange according to claim 18, in which each conversion control circuit is connected to and actuates two input conversion means and two output conversion means, and in which each input conversion means and each output conversion means is connected to eight communication ports.

20. A pulse code modulated digital automatic exchange for a telephone network or like communication network, comprising:
an input/output system including:
line connection means defining N communication ports;
a series of input multiplex conversion means each connected to a plurality of the communication ports and each generating a multiplexed sequence of M-bit parallel digital data signals, each digital data signal being representative of an input signal received at one communication port;
a corresponding series of output de-multiplex conversion means, each connected to the plurality of communication ports served by one input conversion means, for converting M-bit parallel digital data signals to output signals and selectively applying those output signals to those communication ports;
conversion control means, connected to each communication port and to the input conversion means and the output conversion means, for actuating each input conversion means and its associated output conversion means at a multiplex conversion rate determined by the nature of the input and output signals, in accordance with a multiplex scan cycle of given duration;
data storage means, connected to the input conversion means and the output conversion means, including at least N M-bit storage locations, at least one storage location associated with each communication port; and
path control means, connected to the conversion control means and the data storage means, for correlating any and all possible combinations of two communication ports for data transfer calls and actuating the data storage means to effect a first series of data transfers of a parallel M-bit digital data signals from a storage location for the one port in a call to a storage location for the other port in that call and a second series of data transfers of M-bit parallel digital data signals from a storage location for the other port to a storage location for the one port in that call;
and a data transfer system including:
an M-bit parallel digital data bus, connected to the data storage means, for transferring digital data signals recorded at one location in the data storage means to another location in the data storage means;
a multi-bit parallel digital transmit address bus connected to the path control means;
sequence control means, connected to the transmit address bus, for supplying to the transmit address bus a sequence of multi-bit parallel digital transmit addresses in a transfer cycle of given duration comprising at least N transfer time slots, one transmit address and its time slot identifying each communication port;
receive address bus means comprising at least one multi-bit parallel digital receive address bus connected to the path control means;
and address decoder means connected to the data bus, the transmit address bus, and the receive address bus, for comparing a called port address derived from the data bus with the transmit addresses on the transmit address bus to find a match therebetween identifying the time slot of the called port;
the address decoder means further comprising receive address output means to supply a called port address to the receive address bus means when a match is found and thereby enable the path control means to control the data storage means so that one series of data transfers occurs in the transfer time slot of the calling port in each call and the other series of data transfers occurs in the transfer time slot of the called port in that call.

21. A pulse code modulated digital automatic exchange according to claim 20 in which the period for each transfer time slot is less than one microsecond and the duration of the multiplex scan cycle is equal to the duration of the transfer cycle.

22. A pulse code modulated digital automatic exchange according to claim 21 in which:
each input conversion means includes a multiplexer connecting a plurality of communication ports to an analog to digital converter;
and each output conversion means includes a digital to analog converter connected to a de-multiplexer in turn connected to the same ports as the multiplexer.

23. A pulse code modulated digital automatic exchange according to claim 20, or claim 21, or claim 22, in which:
the receive address bus means includes a multi-bit parallel receive address bus and a multi-bit parallel digital auxiliary receive address bus each interconnecting the address decoder means, the sequence control means, and the data storage means;
and the address decoder means further comprises auxiliary receive address output means to apply a called port address to the auxiliary receive address bus when a match is found;
the path control means further including receive address storage means, having one storage location for each communication port, for recording a called port address as a receive address for the calling port and for recording a calling port address as a receive address for the called port in each call.

24. A pulse code modulated digital automatic exchange according to claim 23, in which:
the path control means comprises means for reading out each receive address recorded in the receive address store onto the receive address bus during the transfer time slot for the port assigned to the receive address store location in which that receive address is recorded; and
the path control means further comprises transmit/receive address comparator means for comparing transmit addresses from the transmit address bus with receive addresses on the receive address bus to correlate any two ports in a data transfer call.

25. A pulse code modulated digital automatic exchange according to claim 24 in which:
the data transfer system further includes a system control bus, interconnecting the path control means, the sequence control means, and the address decoder means, to supply on-hook, off-hook, and ring relay status information for each port, during its transfer time slot, to the sequence control means and the address decoder means;

the data transfer system further includes an M-bit parallel digital tone data bus connecting the sequence control means to the data storage means;

the sequence control means further includes a tone generator for generating a dial tone and a busy tone and selectively applying those tones, as M-bit parallel digital data words, to the tone data bus;

and the sequence control means further includes tone enable control means, connected to the data store, to actuate the data store to substitute appropriate tone data from the tone data bus for digital data signals from the data bus during the second data transfer whenever a dial tone or busy tone status obtains.

26. A pulse code modulated digital automatic exchange according to claim 25 in which the data storage means comprises a plurality of data stores, each connected to a limited number of input conversion means and associated output conversion means, all of the data stores being interconnected by the digital data bus.

27. A pulse code modulated digital automatic exchange according to claim 26 in which each data store comprises an input data storage unit and an output data storage unit, each having an M-bit storage location for each port served by the associated input and output conversion means, and in which each data transfer shifts data from an input storage unit to an output storage unit.

28. A pulse code modulated digital automatic exchange according to claim 25, in which the conversion control means comprises a plurality of conversion control circuits, each connected to and actuating a limited number of input and output conversion means.

29. A pulse code modulated digital automatic exchange according to claim 28, in which each conversion control circuit is connected to and actuates two input conversion means and two output conversion means, and in which each input conversion means and each output conversion means is connected to eight communication ports.

30. A pulse code modulated digital automatic exchange according to claim 28 in which:

the path control means comprises a plurality of path control circuits, each connected to one conversion control circuit and to the data storage means.

31. A pulse code modulated digital automatic exchange according to claim 30 in which the data storage means comprises a plurality of data stores, at least one for each path control circuit, all of the data stores being interconnected by the data bus.

32. A pulse code modulated digital automatic exchange according to claim 31 in which each data store is of dual construction, comprising an input data store having M inputs connected to the input conversion circuits served by one conversion control circuit, and an output data store having M outputs connected to the output conversion circuits served by the same conversion control circuit, with each input data store adapted to output parallel digital data signals onto the data bus and each output data store adapted to record parallel digital data signals from the data bus.

33. A pulse code modulated digital automatic exchange according to claim 32 in which each conversion control circuit is connected to and actuates two input conversion means and two output conversion means, and in which each input conversion means and each output conversion means is connected to eight communication ports.

34. A pulse code modulated digital automatic exchange for a telephone network or like communication network, comprising:

an input/output system including:

line connection means defining N communication ports;

input multiplex conversion means connected to the communication ports for generating a multiplexed sequence of M-bit parallel digital data signals each representative of an input signal received at one communication port;

output de-multiplex conversion means connected to the communication ports for converting M-bit parallel digital data signals to output signals and selectively applying those output signals to the communication ports;

conversion control means, connected to the input conversion means and the output conversion means, for actuating the input conversion means and output conversion means at a multiplex conversion rate determined by the nature of the input and output signals;

data storage means connected to the input conversion means and the output conversion means, including at least N M-bit storage locations, one storage location for each communication port;

path control means, connected to the conversion control means and the data storage means, for correlating any and all possible combinations of two communication ports for data transfer calls and actuating the data storage means to effect a first series of transfers of digital data signals from a storage location for the one port in a call to a storage location for the other port in that call and a second series of transfers of digital data signals from a storage location for the other port to a storage location for the one port in that call;

and a data transfer system including:

an M-bit parallel digital data bus, connected to the data storage means, for transferring digital data signals recorded at one location in the data storage means to another location in the data storage means;

transmit address generator means for generating a repetitive sequence of at least N multi-bit parallel digital transfer addresses, one specific address for each port, the entire sequence repeating within a transfer cycle of given duration having one time slot for each transfer address, each time slot being substantially less than one microsecond;

a multi-bit parallel digital transmit address bus connecting the transmit address generator to the path control means;

address decoder means, including address comparator means connected to the transmit address bus and the data bus, for comparing data from the data bus identifying a called port with the transmit addresses on the transmit address bus;

and multi-bit parallel digital receive address bus means, interconnecting the address decoder means and the path control means, for transmitting calling and called port addresses to the path control means in time coordination to enable the path control means to perform the first series of data transfers in the transfer time slot assigned to the one port in a call and to perform the second series of transfers in the transfer time slot assigned to the other port in that call.

35. A pulse code modulated digital automatic exchange according to claim 34 in which:
the duration of each transfer time slot is less than one microsecond;
the input conversion means comprises a series of multiplexers each connected to a limited number of ports;
the output conversion means comprises a corresponding series of de-multiplexers each connected to the same ports as one of the multiplexers;
the conversion control means actuates each multiplexer in accordance with a multiplex scan cycle of given duration; and
the duration of the multiplex scan cycle is equal to the duration of the transfer cycle.

36. A pulse code modulated digital automatic exchange according to claim 34 or claim 35 in which:
the path control means comprises receive address storage means for recording transmit addresses as receive addresses in N individual storage locations, one for each communication port;
and the path control means further comprises transmit/receive address comparator means for comparing transmit addresses from the transmit address bus with receive addresses recorded in the receive address storage means to correlate any two ports for a data transfer call.

37. A pulse code modulated digital automatic exchange according to claim 36 in which:
the receive address storage means comprises a plurality of receive address stores, each serving a limited number of ports and having a storage location for each port it serves;
and the transmit/receive address comparator means compares receive addresses read out from the locations in the various receive address stores onto the receive address bus under control of the transmit addresses on the transmit address bus.

38. A pulse code modulated digital automatic exchange according to claim 37 in which:
the data transfer system further includes a system control bus, interconnecting the path control means and the address decoder means, to supply on-hook, off-hook, and ring relay status information for each port, during its transfer time slot, to the address decoder means;
the data transfer system further includes an M-bit parallel digital tone data bus connected to the data storage means;
the data transfer system further includes a tone generator for generating a dial tone and a busy tone and selectively applying those tones, as M-bit parallel digital data words, to the tone data bus;
and the data transfer system further includes tone enable control means, connected to the data store, to actuate the data store to substitute appropriate tone data from the tone data bus for digital data signals from the data bus during the second data transfer whenever a dial tone or busy tone status obtains.

39. The method of selective transmission of data between two ports of a multiplicity of N communication ports connected to a pulse code modulated digital automatic exchange, comprising the following steps:
A. multiplexing data signals received on each port with those received on a plurality of other ports, much smaller than N, in accordance with a multiplex scan cycle of given duration;
B. converting each multiplexed data signal to an M-bit parallel digital data signal of predetermined format;
C. recording each of the multiplexed digital data signals in a data store at a first storage location specific to the port of origin;
D. reading out each recorded digital data signal onto an M-bit parallel data bus during a time slot specific to the port of origin in the course of a repetitive transfer time cycle having at least N individual time slots;
E. re-recording each digital data signal from the data bus in a second storage location in the data store specific to a port of destination during the time slot specific to the port of origin and;
F. de-multiplexing the data signals and applying each de-multiplexed data signal to its destination port;
the transfer time cycle duration, for all N ports, being equal to the multiplex scan cycle, and each transfer cycle time slot being less than one microsecond.

40. The method of selective transmission of data between ports, in a pulse code modulated digital automatic exchange, according to claim 39, for an exchange in which at least some of the communication ports are telephone ports or the like carrying analog audio signals, in which step B comprises an analog to digital conversion, and comprising the following step:
G. reconverting each digital data signal destined for a telephone port to analog form prior to step F.

* * * * *

UNITED STATES PATENT AND TRADEMARK OFFICE
CERTIFICATE OF CORRECTION

PATENT NO. : 4,455,646

DATED : June 19, 1984

INVENTOR(S) : William T. Bloodworth

It is certified that error appears in the above—identified patent and that said Letters Patent is hereby corrected as shown below:

Fig. 14, should be included as per attached sheet

Signed and Sealed this

Twenty-third Day of September 1986

[SEAL]

Attest:

DONALD J. QUIGG

Attesting Officer  Commissioner of Patents and Trademarks